United States Patent
Sugawa et al.

(10) Patent No.: US 8,861,954 B2
(45) Date of Patent: Oct. 14, 2014

(54) BURST-MODE RECEIVER EQUIPPED WITH OPTICAL AMPLIFIER, METHOD FOR CONTROLLING OPTICAL AMPLIFIER, AND SYSTEM

(75) Inventors: Jun Sugawa, Kamakura (JP); Hiroki Ikeda, Hachioji (JP); Tohru Kazawa, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 310 days.

(21) Appl. No.: 13/336,710

(22) Filed: Dec. 23, 2011

(65) Prior Publication Data

US 2012/0163809 A1    Jun. 28, 2012

(30) Foreign Application Priority Data

Dec. 27, 2010  (JP) ................. 2010-289128

(51) Int. Cl.
- *H04B 17/00* (2006.01)
- *H04J 14/06* (2006.01)
- *H04J 4/00* (2006.01)
- *H04J 14/00* (2006.01)
- *H04B 10/272* (2013.01)

(52) U.S. Cl.
CPC .................................. *H04B 10/272* (2013.01)
USPC ................ 398/34; 398/65; 398/72; 398/75

(58) Field of Classification Search
CPC ............. H04J 14/0212; H04J 14/0221; H04J 14/0249; H04J 14/0245; H04J 3/1694; H04J 14/0227; H04J 14/0282; H04J 14/0246; H04J 14/0247; H04J 14/025; H04J 14/0252; H04J 14/028; H04J 3/0682; H04Q 11/0005; H04Q 11/0067; H04B 10/2587; H04B 10/293; H04B 10/272; H04B 10/27; H04B 10/2939; H04B 10/70; G01J 1/32; G01J 9/00; H05B 37/0218; H04L 7/0075; C08G 77/26; C08G 77/455; C08L 2205/02
USPC ........ 398/34, 65, 72, 70, 71, 66, 92, 160, 207
See application file for complete search history.

(56) References Cited

U.S. PATENT DOCUMENTS 7,362,498 B1 * 4/2008 Li et al. .................... 359/341.41
8,364,043 B2 * 1/2013 Lee et al. ....................... 398/160

(Continued)

FOREIGN PATENT DOCUMENTS

JP    07-202348 A    8/1995
JP    11-74604 A    3/1999

(Continued)

OTHER PUBLICATIONS

Z. Belfqih et al., Enhanced Optical Budget System Performance of an Burst Extended PON at 10.7Gbit/s over 60km of Fibre, ECOC 2008, Sep. 21-25, 2008, Brussels, Belgium, vol. 4-123.

(Continued)

*Primary Examiner* — Ken Vanderpuye
*Assistant Examiner* — Abbas H Alagheband
(74) *Attorney, Agent, or Firm* — Crowell & Moring LLP

(57) ABSTRACT

To, even when a transmission wavelength varies in each ONU and an optical amplifier gain depends on the wavelength in an OLT equipped with an optical amplifier, prevent the optical amplifier gain from varying in every ONU and thus prevent deterioration of a dynamic range. The OLT estimates a transmission wavelength of each ONU at the time of ONU registration, and retains a correspondence between an ONU identifier and the transmission wavelength. Moreover, for every burst, an injection current to the optical amplifier is adjusted based on a wavelength and optical amplifier characteristic database.

19 Claims, 30 Drawing Sheets

(56) References Cited

U.S. PATENT DOCUMENTS

| | | | |
|---|---|---|---|
| 2003/0099475 A1* | 5/2003 | Nemoto et al. | 398/83 |
| 2008/0187312 A1* | 8/2008 | Kazawa et al. | 398/63 |
| 2009/0080888 A1* | 3/2009 | Sugawara et al. | 398/61 |
| 2009/0169209 A1* | 7/2009 | Sugawara et al. | 398/75 |
| 2009/0208227 A1* | 8/2009 | Yoshida et al. | 398/202 |
| 2009/0232501 A1* | 9/2009 | Dai | 398/66 |
| 2009/0322233 A1* | 12/2009 | Sone | 315/158 |
| 2011/0200333 A1* | 8/2011 | Schrenk et al. | 398/67 |
| 2012/0057871 A1* | 3/2012 | Dai | 398/58 |
| 2012/0063774 A1* | 3/2012 | Niibe et al. | 398/34 |
| 2012/0163809 A1* | 6/2012 | Sugawa et al. | 398/34 |
| 2013/0028599 A1* | 1/2013 | Sone et al. | 398/37 |

FOREIGN PATENT DOCUMENTS

| | | |
|---|---|---|
| JP | 2000-330146 A | 11/2000 |
| JP | 2002-57627 A | 2/2002 |
| JP | 2003-163641 A | 6/2003 |
| JP | 2009-200633 A | 9/2009 |

OTHER PUBLICATIONS

Part 3: Carrier Sense Multiple Access with Collision Detection (CSMA/CD) Access Method and Physical Layer Specifications, IEEE Std 802.3ah -2004, (Amendment to IEEE Std 802.3 -2002 as amended by IEEE Stds 802. -2002, 802.3af -2002, 802.3aj2003 and 802.3ak -2004), Sep. 7, 2004, IEEEComputer Standards, USA.

Gigabit-capable Passive Optical Networks (GPON): Physical Media Dependent (PMD) layer specification, Series G: Transmission Systems and Media, Digital Systems and Networks, Digital sections and digital line system—Optical line systems for local and access networks, International Telecommunication Union, Mar. 2003.

Part 3: Carrier Sense Multiple Access with Collision Detection (CSMA/CD) Access Method and Physical Layer Specifications, IEEE Std 802.3av -2009 (Amendment of IEEE Std 802.3 -2008), IEEE Computer Society, Oct. 30, 2009, USA.

Japanese Office Action of JP Application No. 2010/289128 dated Feb. 4, 2014 (Two (2) pages).

* cited by examiner

FIG. 8

| INJECTION CURRENT | POLARIZATION DIRECTION | WAVELENGTH | GAIN |
|---|---|---|---|
| I_1 | Pol_1 | Λ_1 | Gain_111 |
| I_1 | Pol_1 | Λ_2 | Gain_112 |
| ... | ... | ... | ... |
| I_1 | Pol_1 | Λ_n | Gain_11n |
| I_1 | Pol_2 | Λ_1 | Gain_121 |
| I_1 | Pol_2 | Λ_2 | Gain_122 |
| ... | ... | ... | ... |
| I_1 | Pol_2 | Λ_n | Gain_12n |
| I_2 | Pol_1 | Λ_1 | Gain_211 |
| ... | ... | ... | ... |
| I_2 | Pol_2 | Λ_n | Gain_22n |
| ... | | | |
| I_m | Pol_2 | Λ_n | Gain_m2n |

FIG. 9

| ONU ID | WAVELENGTH |
|---|---|
| 1 | $\Lambda$normal-1 |
| 2 | $\Lambda$normal-2 |
| 3 | $\Lambda$normal-3 |
| ... | ... |
| N | $\Lambda$normal-N |
| N+1 (not registered) | $\Lambda$discover-1 |
| N+2 (not registered) | $\Lambda$discover-2 |
| N+3 (not registered) | $\Lambda$discover-3 |
| ... | ... |
| N+M (not registered) | $\Lambda$discover-M |

901 — ONU ID
902 — WAVELENGTH

BURST-MODE RECEIVER EQUIPPED WITH OPTICAL AMPLIFIER, METHOD FOR CONTROLLING OPTICAL AMPLIFIER, AND SYSTEM

CLAIM OF PRIORITY

The present application claims priority from Japanese patent application JP 2010-289128 filed on Dec. 27, 2010, the content of which is hereby incorporated by reference into this application.

FIELD OF THE INVENTION

The present invention relates to an optical line terminal (OLT) in a Passive Optical Network, and more specifically, to an optical receiver section equipped with an optical amplifier.

BACKGROUND OF THE INVENTION

Spread of Optical Access Networks

In recent years, a demand to improvement in the speed to networks increases with spread of the Internet, and popularization of ADSL (Asymmetric Digital Subscriber Line), B-PON (Broadband PON), E-PON (Ethernet PON), and G-PON (Gigabit Capable PON) is progressing are progressing. Especially in the PON system, in connecting an optical line terminal (OLT) placed in a telephone company's local office and an optical network unit (ONU) placed in each user premises, the OLT extends therefrom one strand of fiber, which is divided using an optical splitter and each of divided fibers is connected to each user. Since this scheme enables an installation cost of fibers to be lowered and enables high-speed communication to be performed because of use of optical transmission, popularization of this system is being proceeded all over the world.

[PON System]

Among the PON systems, a TDM-PON system where lights of different wavelengths are used for downlink transmission from the OLT to the ONU and for uplink transmission from the ONU to the OLT, and signals of ONUs are time-division multiplexed is widely used. This TDM-PON system is adopted in the B-PON, the E-PON, the G-PON, the 10G-EPON, and the XG-PON.

[Burst-Mode Receiver]

In the TDM-PON system, a signal of uplink transmission becomes a burst signal with its strength largely varying. A reason why the strength of the signal varies largely is that a distance between the OLT and the ONU varies for each ONU, and as a result, the amount of optical loss occurring in fiber differs for every ONU. Moreover, a reason why the signal becomes the burst signal is that signals are multiplexed by time division in the uplink transmission and there occur a time in which any one of the ONU's transmits and a time in which none of the ONU's transmit. The OLT needs a burst-mode receiver for receiving this burst signal.

[Application of Optical Amplifier in PON]

A method whereby a transmission allowable dissipation in a PON section is extended by using the optical amplifier is known (Z. Belfqih et al., ECOC2008, Th2. F.4. (2008)). Moreover, a method for expanding a dynamic range of a receiver by using an optical amplifier in the OLT is known (Japanese Unexamined Patent Application Publication No. 2009-200633).

[Variation in Transmission Wavelength in Each ONU]

A transmission wavelength range of ONU's in the PON is prescribed by a standard. An uplink transmission wavelength range of ONU's in the E-PON is 1260 to 1360 nm (IEEE-802.3ah, Clause 60.3, and Clause 60.4). An uplink transmission wavelength range of ONU's in the G-PON is 1260 to 1360 nm (ITU-T Recommendation G.984.2, Section 8.2). Moreover, in a PRX30 standard of 10 G-EPON, an uplink 1G transmission wavelength of ONU's is 1260 to 1360 nm (IEEE 802.3av, Clause 75.4). This is to permit a transmission wavelength variation resulting from variations in parts and a temperature change of a transmission laser. Therefore, the OLT needs to be capable of receiving a signal at these wavelengths.

[Characteristic of Optical Receiver]

Since when an APD and a PIN-PD are used as of an optical receiver, there is almost no influence in reception sensitivity even if the wavelength of the signal varies from 1260 to 1360 nm, this variation does not become a problem in particular.

[Characteristic of Optical Amplifier]

In the optical amplifier, it is known that a gain of the signal amplified by the optical amplifier is dependent on its wavelength. Therefore, when the optical signals with different wavelengths are inputted into the optical amplifier, a gain of the optical amplifier differs for every wavelength of the signals. Moreover, it is known that the optical amplifier has a polarization dependency. That is, the gain by which the optical signal is amplified differs depending on a polarization direction of the optical signal inputted into the optical amplifier. This polarization dependency is large especially in semiconductor optical amplifiers. FIG. 5 shows a wavelength dependency and the polarization dependency of the semiconductor optical amplifier. In this figure, as one example, the polarization- and wavelength-dependencies of the gain of the semiconductor optical amplifier used in a wavelength band (from 1,260 nm to 1,360 nm) are shown. Therefore, an output level of the optical amplifier differs for every wavelength and polarization.

[Solution Technology of Improving a Characteristic of Optical Amplifier]

In the transmission system by wavelength division multiplexing, in order to compensate a difference in the optical amplifier output level for every wavelength, there is disclosed means as follows: the light signals are separated to respective wavelengths by a wavelength division multiplexing coupler after being amplifying by the optical amplifier, and subsequently variable attenuators having different amounts of attenuation are arranged so as to compensate the difference in the output level, and so that the differences in level for respective wavelengths are suppressed (for example, Japanese Unexamined Patent Application Publication No. 2003-163641). Moreover, Japanese Unexamined Patent Application Publication No. Hei11(1999)-74604 discloses that the polarization dependency is improved by at least two electrically independent semiconductor optical amplifier sections that have different polarization characteristics and are optically connected in series in order to improve the polarization dependency of the semiconductor optical amplifier.

SUMMARY OF THE INVENTION

Although, in the technology described in Japanese Unexamined Patent Application Publication No. 2003-163641, the wavelength used is known in the system, and therefore it is possible to separate optical signals depending on their respective wavelengths using a WDM coupler etc. and the optical signals of respective wavelengths are compensated for their wavelength dependent gains. In the PON system, the wavelengths of respective ONU's are not generally managed, and therefore the gain dependency on the wavelength of each ONU cannot be compensated. For example, as a configuration of the OLT equipped with an optical amplifier, a configuration as shown in FIG. 3 can be considered. Incidentally, let it be assumed that the optical amplifier is used on a condition of a constant injection current to the optical amplifier. When signals whose wavelengths are different for respective ONU's are inputted into the optical receiver section of the OLT equipped with this optical amplifier, since gains of the optical amplifier are different for respective wavelengths, a range that the optical receiver in the latter stage can receive is different depending on the wavelength. Performance of the optical receiver in the later stage restricts a range of optical strength that can be received by the optical receiver in the later stage.

A range that is receivable at each wavelength and a range that can be received by the optical receiver section in this case will be explained using FIG. 6. Incidentally, let it be assumed that the characteristic of the optical amplifier used here is the same as the characteristic shown in FIG. 5.

When the wavelength $\Lambda=1260$ nm, the gain of the optical amplifier is the largest, and as a result, the ranges that can be received by the optical receiver in the later stage are ranges when the OLT input power are R501 and R504, respectively. Moreover, in this wavelength, since the polarization state B has a larger gain than the polarization state A does, R504 exists on a weaker power side. Similarly, the receivable ranges of the case of polarization states A, B at wavelengths of 1310 nm and 1360 nm are shown by R502, R505, R503, and R506.

Regarding performance of the optical receiver section in the PON, the receivable range is important for any wavelength of 1260 to 1360 nm. However, the range of being commonly receivable at respective wavelengths in the both polarization states is a range of R500, which will be narrowed depending on a wavelength dependency and a polarization dependency of an optical amplifier gain. Therefore, it is required to make the gain of a semiconductor optical amplifier exist in a certain range even if the wavelength and the polarization state of the received light are different for every ONU.

Moreover, since the technology described in Japanese Unexamined Patent Application Publication No. Hei11 (1999)-74604 comes with a need to use multiple optical amplifiers, it is difficult to attain cost reduction of the OLT. If a single semiconductor optical amplifier is used in the OLT, the receivable range of the receiver will become narrow by the polarization dependency.

Moreover, the technology described in Japanese Unexamined Patent Application Publication No. 2009-200633 does not take into consideration an influence on the optical receiver section by the wavelength dependency and the polarization dependency of the gain of the optical amplifier, and in the case where the transmission wavelength varies for every ONU and the gain of the optical amplifier has the wavelength dependency or the polarization dependency, a receivable range for multiple wavelengths will become narrow.

Therefore, the technologies described in Japanese Unexamined Patent Application Publication No. 2003-163641, and Japanese Unexamined Patent Application Publication No. Heil 1 (1999)-74604 cannot prevent degradation of the receivable range caused by the wavelength dependency and the polarization dependency of the optical amplifier with a cheap configuration for an unknown transmission wavelength of the ONU.

The present invention is made in view of such a problem and has an object to keep the gain of the optical amplifier in the OLT not dependent on the wavelength but to be in a fixed range even in the case where the transmission wavelength varies for each ONU or where the gain of the optical amplifier has the wavelength dependency or the polarization dependency.

The optical receiver section has: an optical amplifier for amplifying the optical signal by a gain according the injection current; a burst-mode optical receiver for converting the optical signal outputted from the optical amplifier into an electrical signal; a driver circuit for driving the optical amplifier by the injection current; and an optical amplifier control section for controlling a drive current of the driver circuit based on the transmission wavelength of a transmission source ONU of an optical burst signal that is received next.

The optical receiver section can keep the gain of the optical amplifier almost constant without depending on the wavelength even when the wavelength of the received burst signal varies for every ONU. Therefore, even in the case where the wavelength varies for every ONU and the gain of the optical amplifier is dependent on the wavelength or polarization direction, it is possible to keep the receivable range of the receiver in a wide state.

Moreover, even in the case where the wavelength dependency and the polarization dependency of the low-cost optical amplifier are large, since the receivable range does not deteriorate, it becomes possible to use the low-cost optical amplifier. Therefore, it is possible to lower a production cost in the OLT equipped with the optical amplifier.

BRIEF DESCRIPTION OF THE DRAWINGS

FIG. 8 is an example of a table that is retained in the optical amplifier characteristic management section in the first embodiment of the present invention;

FIG. 9 shows an ONU wavelength management table in the first embodiment of the present invention;

DETAILED DESCRIPTION OF THE PREFERRED EMBODIMENTS

Hereafter, embodiments of the present invention will be described in detail with reference to drawings. Incidentally, common parts in the figures are given the same symbols, respectively.

First Embodiment

Configuration of General PON System

Figure 1:
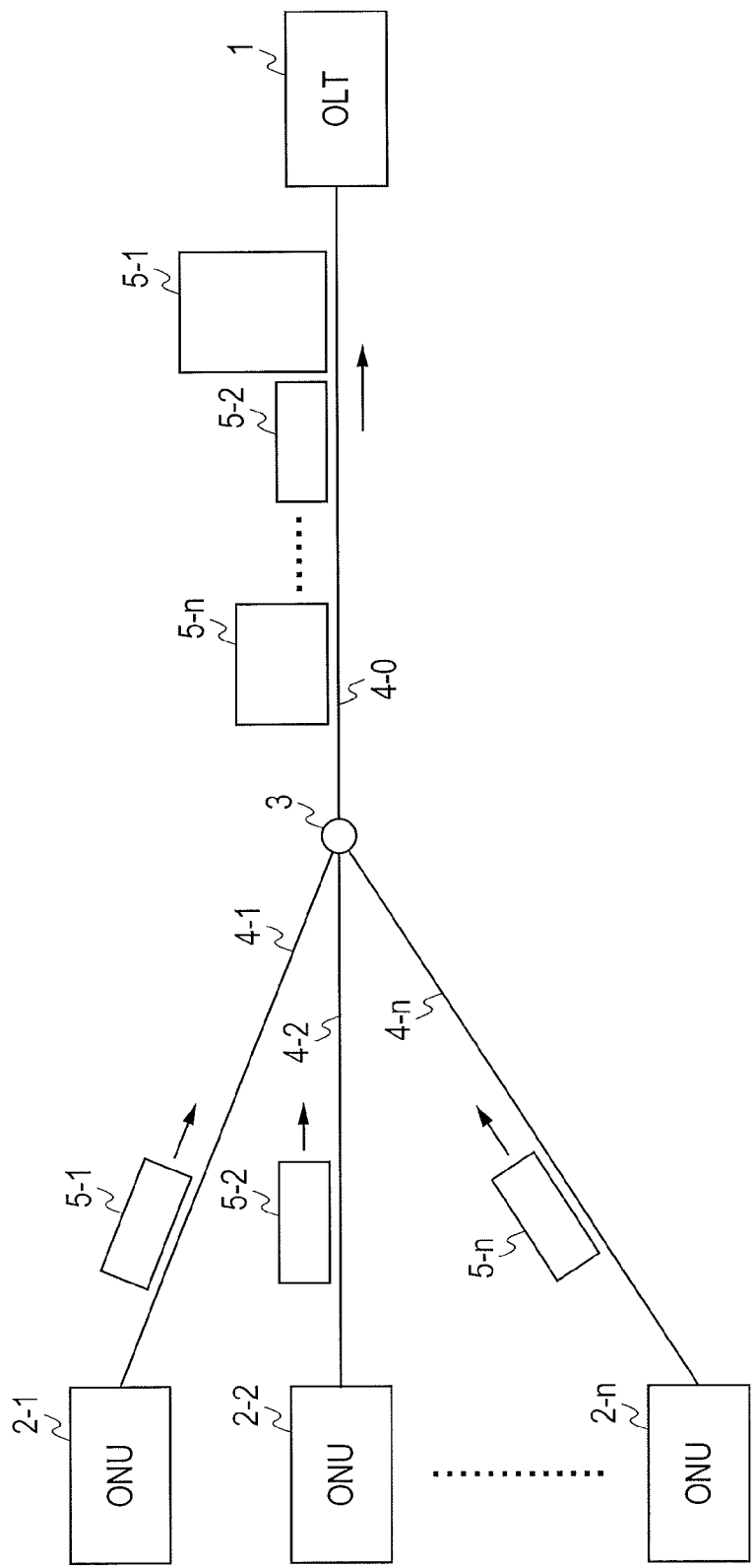
FIG. 1 is a configuration of a general PON system.

FIG. 1 shows a configuration of the optical access network using PON. The optical access network has OLT1, an optical splitter 3, and multiple ONU2's (2-1 to 2-n). The OLT1 is connected with the optical splitter 3 through optical fiber 4-0 that is of a trunk line. ONU2's (2-1 to 2-n) are connected to the optical splitter 3 through the optical fibers 4 (4-1 to 4-n) of branch lines, respectively. Uplink transmission to the OLT1 from ONU2's (2-1 to 2-n) will be explained. The optical signals that ONU2's sent out are multiplexed by the optical splitter 3. The multiplexed optical signal is inputted into the OLT1. The distance between ONU2 and the OLT1 differs for every ONU. Moreover, since the optical signal attenuates as the distance increases, the optical signal inputted into the OLT1 becomes a burst signal whose strength varies.

[Configuration of General OLT]

Figure 2:
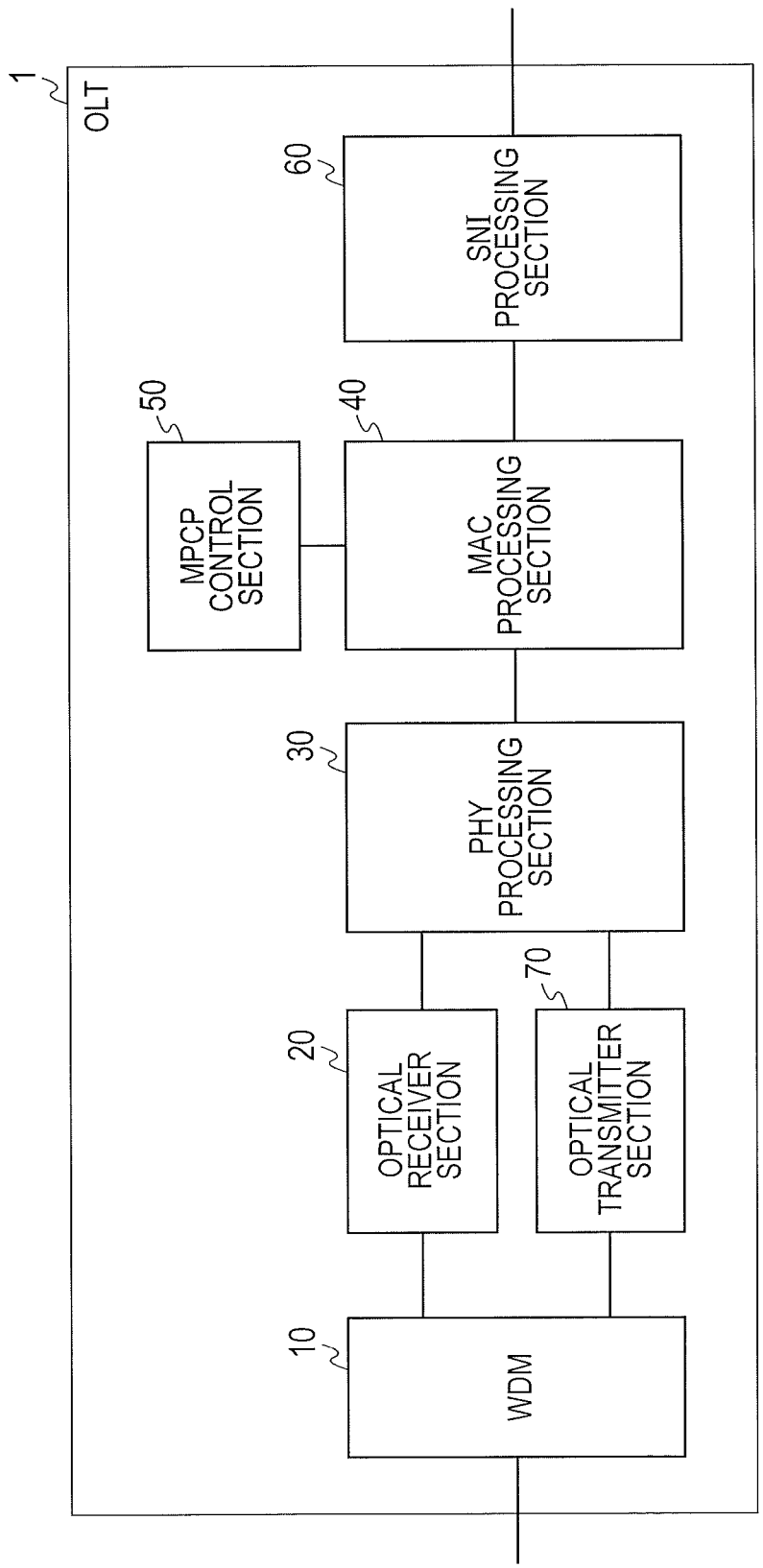
FIG. 2 is a configuration of a general OLT.
Figure 3:
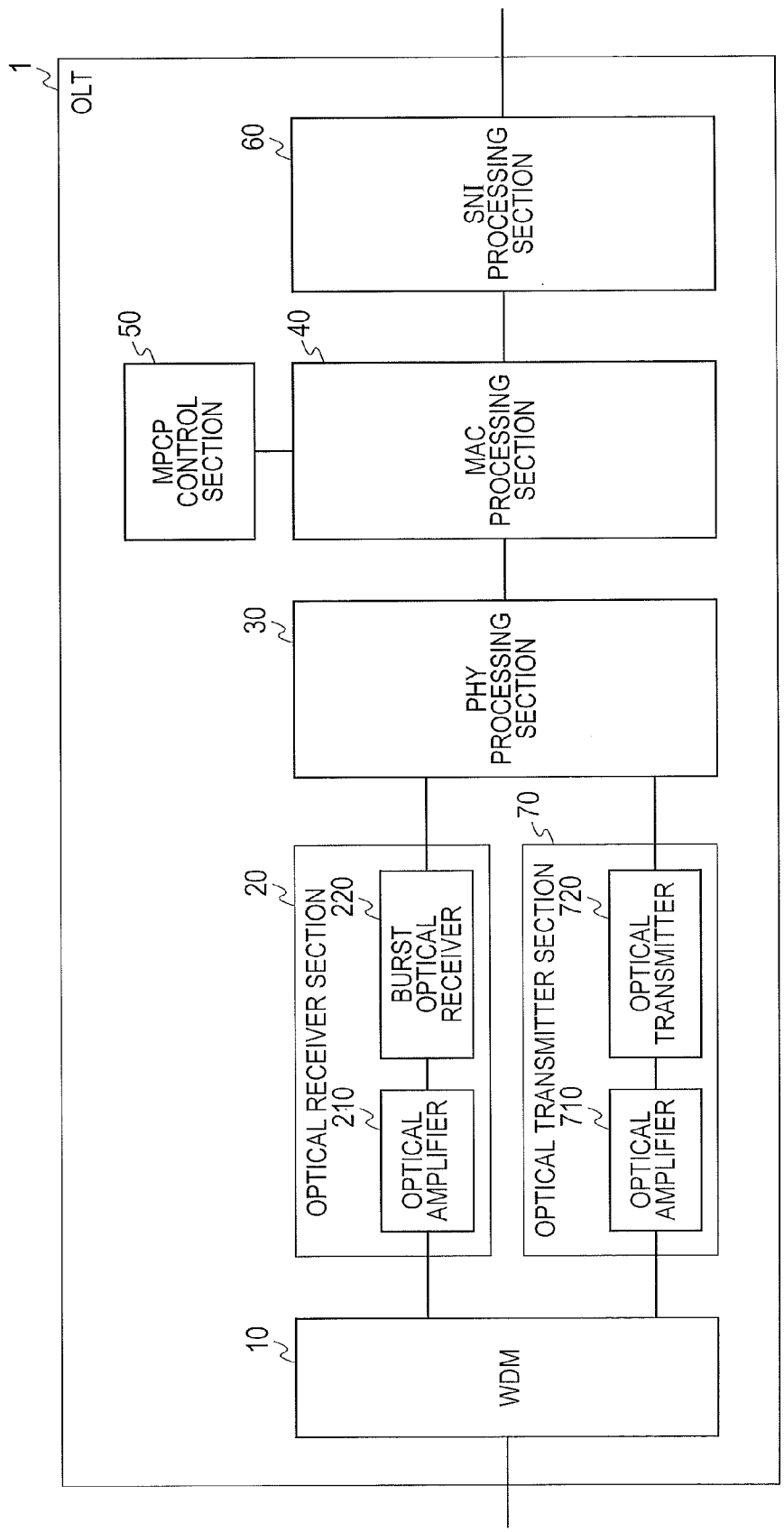
FIG. 3 is a configuration of an OLT equipped with an optical amplifier.

FIG. 2 shows a configuration of an OLT1 device. The OLT1 includes a WDM 10, an optical receiver section 20, a PHY processing section 30, a MAC processing section 40, an MPCP control section 50, and an SNI processing section 60.

THE WDM 10 multiplexes and demultiplexes an uplink optical signal (wavelength λ1), and a downlink optical signal (wavelength λ2). THE WDM 10 outputs the uplink optical signal inputted from optical fiber 4-0 of the trunk line to the optical receiver section 20. Moreover, the WDM 10 outputs the downlink optical signal inputted from an optical transmitter section 70 to the optical fiber 4-0 of the trunk line. The optical receiver section 20 converts the uplink optical signal inputted from the WDM 10 into a current signal, converts and amplifies further the current signal into a voltage signal, and outputs it to the PHY processing section 30. The PHY processing section extracts a clock from the inputted voltage signal, performs retiming of the voltage signal with the extracted clock, and converts the voltage signal into a digital signal. Further, the PHY processing section 30 extracts a frame by decoding the digital signal, and sends it out to the MAC processing section 40. The MAC processing section 40 identifies the extracted frame as either a user data frame or an MPCP control frame, and sends out the MPCP control frame to the MPCP control section 50 and the user data frame to the SNI processing section 60, respectively. The MPCP control section 50 performs analysis and creation of the MPCP control frame that is exchanged in a PON section. The SNI processing section 60 converts the frame inputted from the MAC processing section 40 into a signal matching an interface of the SNI. Moreover, the optical transmitter section 70 converts an electrical signal inputted from the PHY processing section 30 into an optical signal and outputs it to the WDM 10.

[Sequence in ONU Registration]

Figure 4:
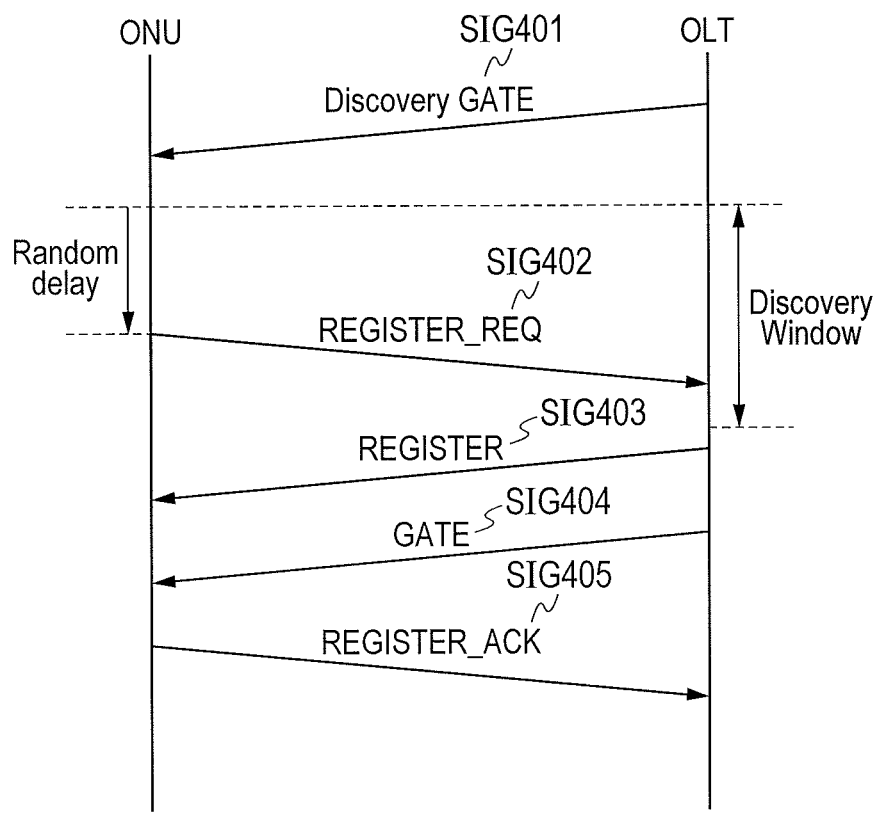
FIG. 4 shows a Discovery operation in the PON
Figure 5:
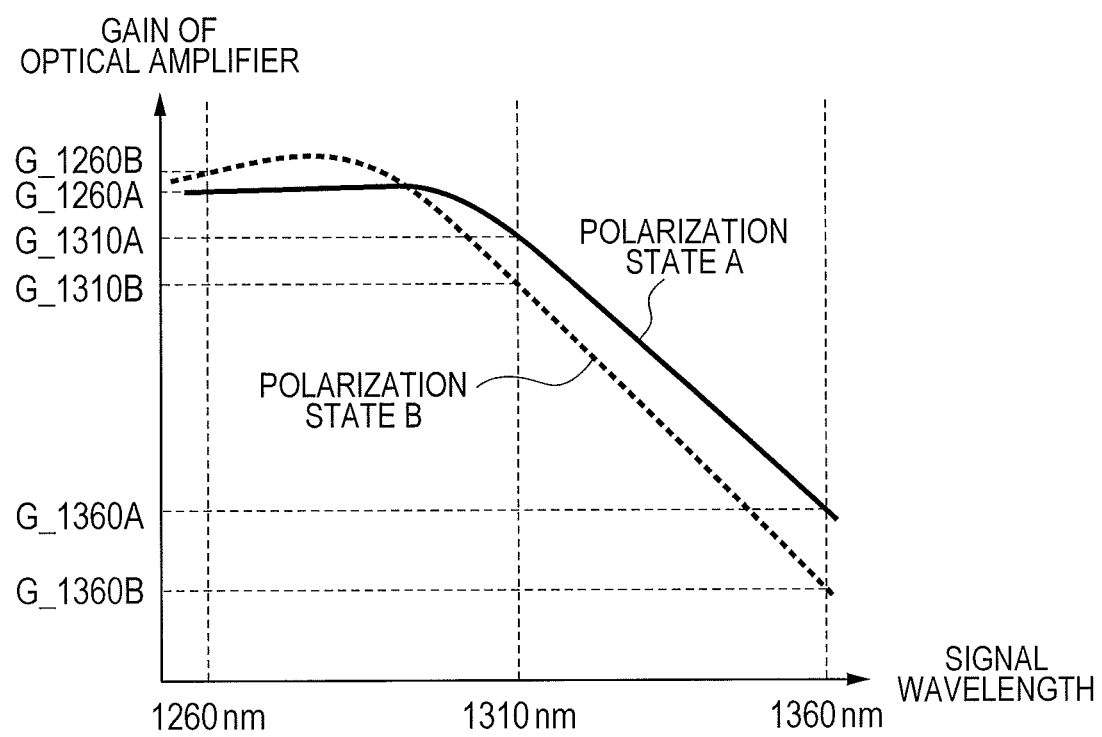
FIG. 5 is an example of a characteristic of a semiconductor optical amplifier.
Figure 6:
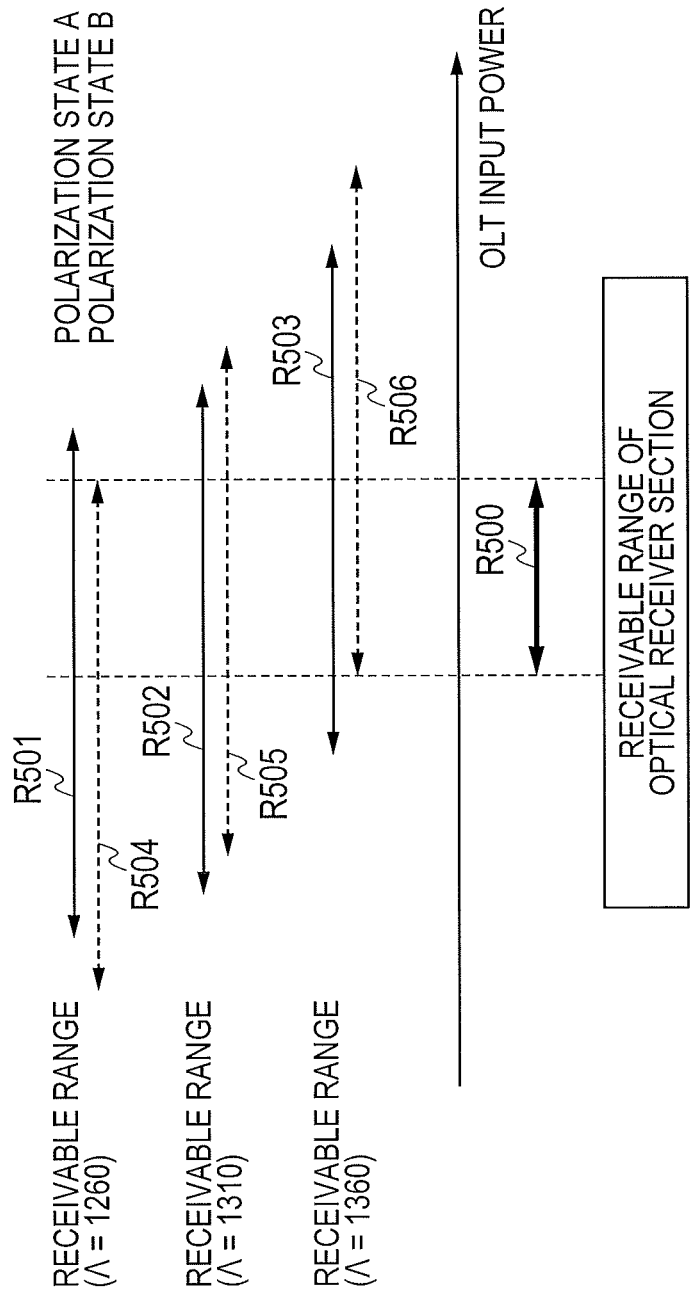
FIG. 6 shows a receivable range in the OLT equipped with the optical amplifier of the related art.

FIG. 4 shows a sequence of ONU registration. The sequence of ONU registration is called a Discovery process in the 10G-EPON, and is applied in the case where connecting the ONU newly or similar cases. In this Discovery process, a measurement of a round-trip time between the ONU and the OLT and information acquisition about the connected ONU are performed.

The OLT transmits DiscoveryGATE to all the ONU's (SIG401). When an unregistered ONU receives the DiscoveryGATE, it waits for a Random delay and transmits a REGISTER_REQ to the OLT1 (SIG402). The reason of waiting the Random delay is to prevent collision of the uplink optical signals when multiple unregistered ONU's respond to the DiscoveryGATE. Moreover, for a fixed period (DiscoveryWindow) after transmitting the DiscoveryGATE, the OLT does not assign a time slot to other registered ONU's. Only unregistered ONU's can transmit signals during this DiscoveryWindow period. Upon reception of the REGISTER_REQ, the OLT transmits REGISTER to all the ONU's (SIG403). After that, the OLT transmits GATE to the ONU to which the REGISTER_REQ is transmitted (SIG404). Upon reception of the GATE, the ONU transmits REGISTER_ACK to the OLT (SIG405).

Incidentally, a REGISTER_REQ message includes time stamp information representing a time when the ONU sent out the signal. The OLT calculates a round trip time (RTT) between the ONU and the OLT by comparing this time stamp and a current time that the OLT retains. This RTT also represents a distance between the OLT and the ONU.

[Configuration of Optical Receiver Section in the First Embodiment]

Figure 7:
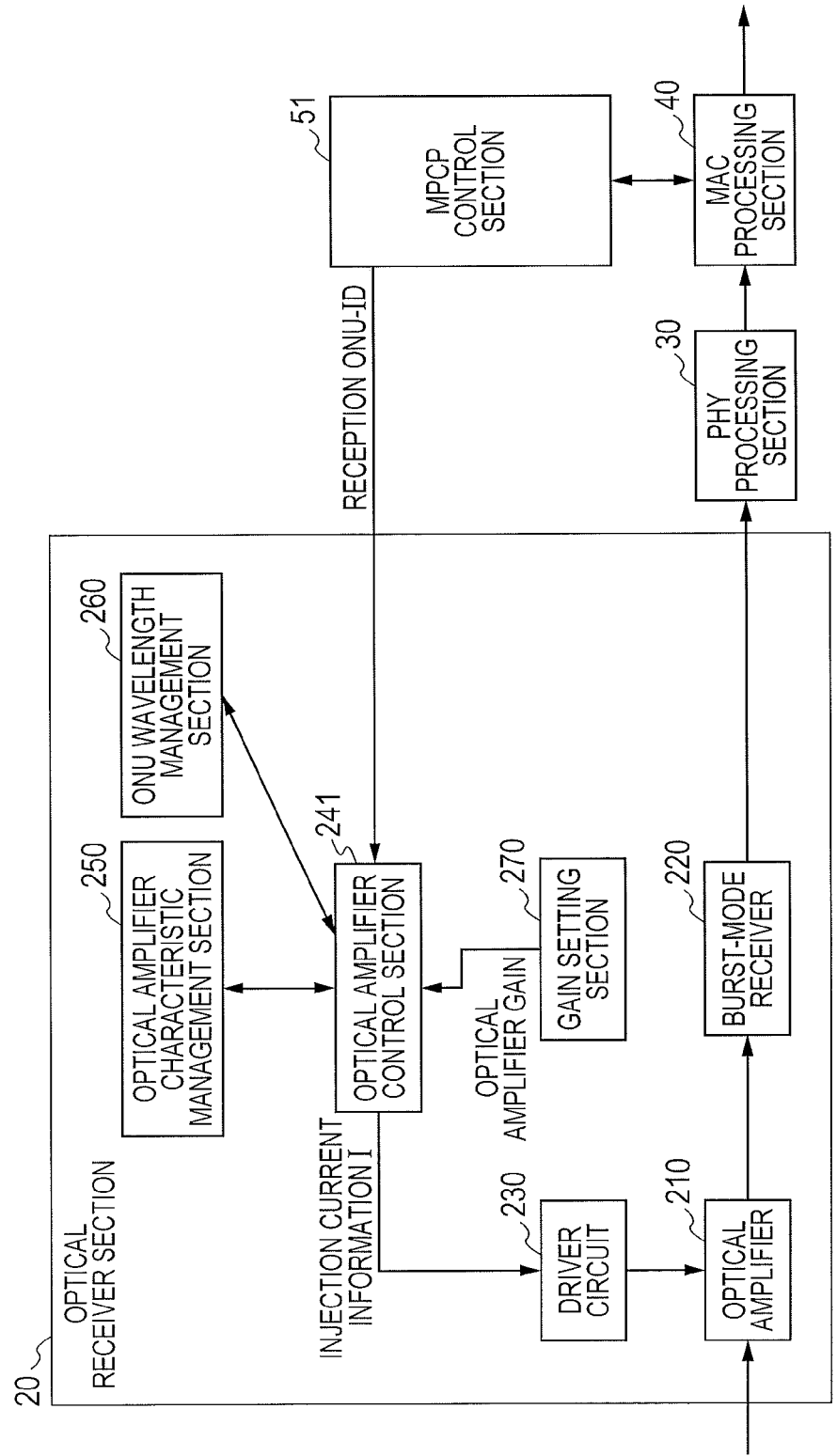
FIG. 7 is a configuration of an optical receiver section in a first embodiment of the present invention.

FIG. 7 shows a configuration of the optical receiver section 20 in a first embodiment of the present invention. The optical receiver section of the present invention includes an optical amplifier 210, a burst-mode receiver 220, a driver circuit 230, an optical amplifier control section 241, an optical amplifier characteristic management section 250, an ONU wavelength management section 260, and a gain setting section 270.

An MPCP control section 51 and the optical amplifier control section 241 are connected with control line. The MPCP control section 51 transmits a reception ONU-ID that is ONU-ID information of the burst signal that the OLT1 receives to the optical amplifier control section 241. The optical signal inputted into the optical amplifier 210 is amplified by the gain that depends on the injection current injected into the optical amplifier, the wavelength of the input optical signal, and the polarization state of the input optical signal. The optical signal amplified by the optical amplifier 210 is inputted into the burst-mode receiver 220.

The burst-mode receiver 220, the PHY processing section 30, and the MAC processing section 40 are as have already been explained in the explanation of FIG. 2.

The driver circuit 230 injects a current to the optical amplifier 210 based on injection current information I inputted from an optical amplifier control section 240.

The optical amplifier control section 241 decides the injection current based on an optical amplifier gain acquired from the gain setting section 270, the reception ONU-ID acquired from the MPCP control section 51, wavelength information acquired from the ONU wavelength management section 260, and optical amplifier characteristic information acquired from the optical amplifier characteristic management section 250, and outputs the injection current information I representing an amount of injection current to the driver circuit 230. A method for deciding the injection current of the optical amplifier control section 241 will be described later.

The gain setting section 270 is set to have a desired gain considering a receivable range of optical strength of the optical receiver in the latter stage.

The optical amplifier characteristic management section 250 retains an optical amplifier characteristic management table showing the characteristic of the optical amplifier 210.

FIG. 8 shows an example of the optical amplifier characteristic management table. The table shows a gain 804 of the optical amplifier to a set of an injection current 801 to the driver circuit 230, a polarization direction 802 of the optical signal inputted into the optical amplifier, and a wavelength 803 of the optical signal. In this example, a gain $G\_xyz$ to an injection current $I\_x$ (x=1 to m), a polarization direction $Pol\_y$ (y=1 to 2), and a wavelength $\Lambda\_z$ (z=1 to n) is registered. The polarization directions $Pol\_1$, $Pol\_2$ are set in polarization directions that intersect perpendicularly to each other. Moreover, the wavelength $\Lambda\_z$ is set to be in a range of wavelength of the inputted signal that is specified by a system. For example, in a system of EPON (IEEE802.3ah), the wavelength $\Lambda\_z$ is set so as to cover 1260 nm to 1360 nm. Moreover, the injection current is set so that a desired gain is attainable at each wavelength. Neither the injection current $I\_x$ nor the wavelength $\Lambda\_z$ is necessarily required to be set at equal intervals. For example, in a wavelength range where a wavelength dependency of gain is small, a wavelength interval is set large, while in a wavelength range where the wavelength dependency of gain is large, a wavelength interval is set small, whereby the number of entries of the optical amplifier characteristic management table can be reduced.

The information registered in the optical amplifier characteristic management table is registered there by measuring input/output characteristics of the optical amplifier in advance and based on the measured data. Specifically, what is necessary is to calculate the gain by inputting the optical signal of the specified polarization direction and the specified wavelength on a condition of each injection current and by measuring the input power and the output power of the optical signal.

The ONU wavelength management section 260 retains a correspondence of an ONU identifier (ONU-ID) and an ONU transmission wavelength. FIG. 9 shows an example of the ONU wavelength management table retaining this correspondence. Incidentally, the ONU-ID may be any information as long as it is information whereby the ONU connected to the OLT1 is identified. For example, the MAC Address of the ONU or a serial number of the ONU will do. In the first embodiment, before connecting the ONU, the transmission wavelength of each ONU is investigated and registered. For example, what is necessary is to measure the transmission wavelength of each ONU in advance, and to register the measured wavelength and the ONU identifier.

[Operations of Optical Amplifier Control Section in the First Embodiment]

Figure 11:
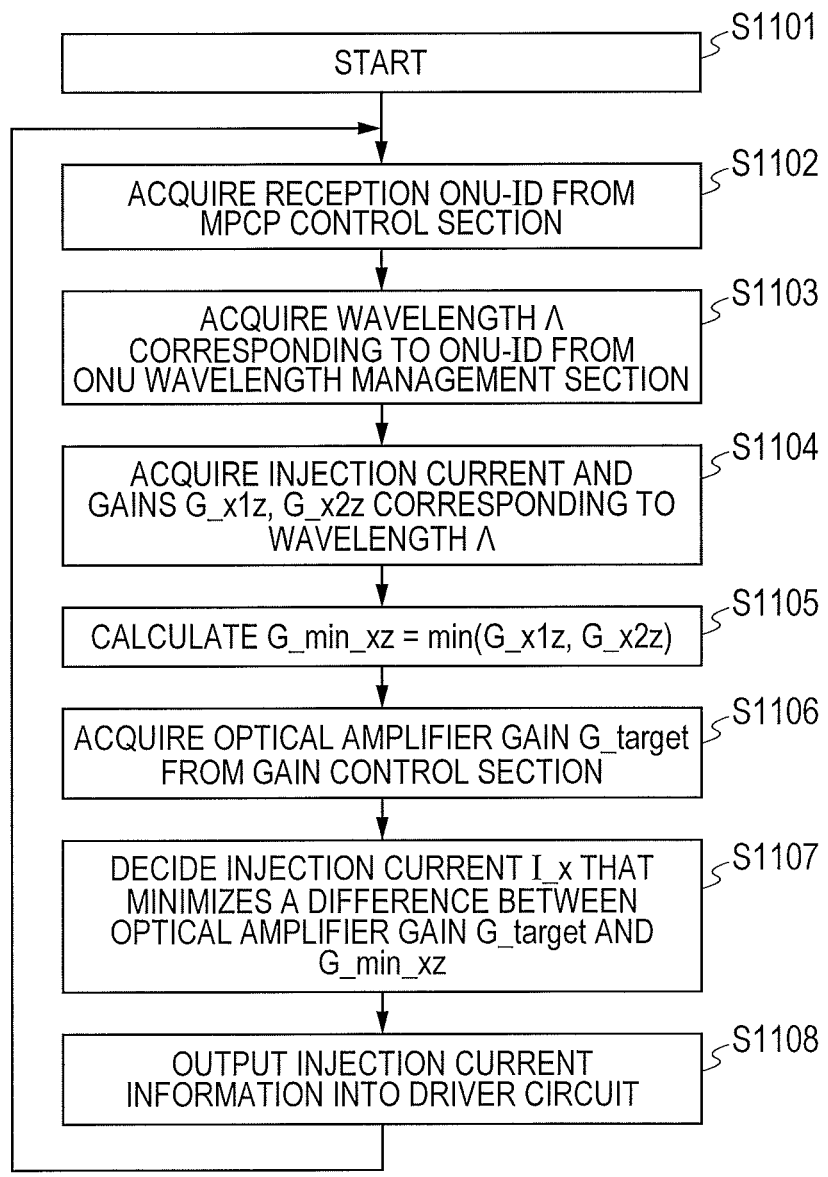
FIG. 11 is a flowchart showing operations of the optical amplifier control section in the first embodiment of the present invention.

Operations of the optical amplifier control section 241 in a first embodiment will be explained in detail. FIG. 11 shows a flowchart showing operations of the optical amplifier control section in the first embodiment. The operation of the optical amplifier control section is started at S1101, and the process moves to S1102. At S1102, the optical amplifier control section acquires the reception ONU-ID from the MPCP control section 51, and the process moves to S1103. At S1103, the optical amplifier control section inquires of the ONU wavelength management section 260 as to a wavelength corresponding to the acquired reception ONU-ID, and acquires the wavelength corresponding to the ONU-ID. Upon acquisition of the wavelength, the process moves to S1104. At S1104, the optical amplifier control section acquires a correspondence between the injection current $I\_x$ and gains $G\_x1z$, $G\_x2z$ with respect to the acquired wavelength. For example, when the wavelength is $\Lambda\_3$, a correspondence between $I\_x$ and $G\_x13$, $G\_x23$ (x=1 to m) is acquired. When acquisition of the correspondence between the injection current and the gain is completed, the process moves to S1105. At S1105, the optical amplifier control section calculates a correspondence between the injection current $I\_x$ and gain $G\_min\_xz=min(G\_x1z, G\_2z)$ from the acquired $I\_x$ and $G\_x1z$, $G\_2z$. Here, the function min(A, B) returns a smaller value of A and B. Upon completion of the calculation, the process moves to S1106. At S1106, the optical amplifier control section acquires $G\_target$ that is the optical amplifier gain being intended to be set from the gain setting section 270, and the process moves to S1107. At S1107, the optical amplifier control section decides the injection current $I\_x$ that minimizes a difference between the optical amplifier gain $G\_target$ that is intended to be set and $G\_min\_xz$ (x=1 to m). Upon completion of the decision of the injection current, the process moves to S1108. At S1108, the decided injection current information is outputted to the driver circuit. Upon completion of the output, the process returns to S1102. By repeating the steps of S1102 to S1108, it is possible to control the injection current based on the transmission wavelength and the received optical power of each ONU when receiving the optical signal from the each ONU.

[Example of Operation Sequence at the Time of Normal Transmission in the First Embodiment]

Operations at the time of uplink transmission between the ONU and the OLT in the first embodiment of the present invention will be explained. Here, the explanation will be given dividing the operations into those at the time of normal transmission and those at the time of a Discovery operation.

Figure 12:
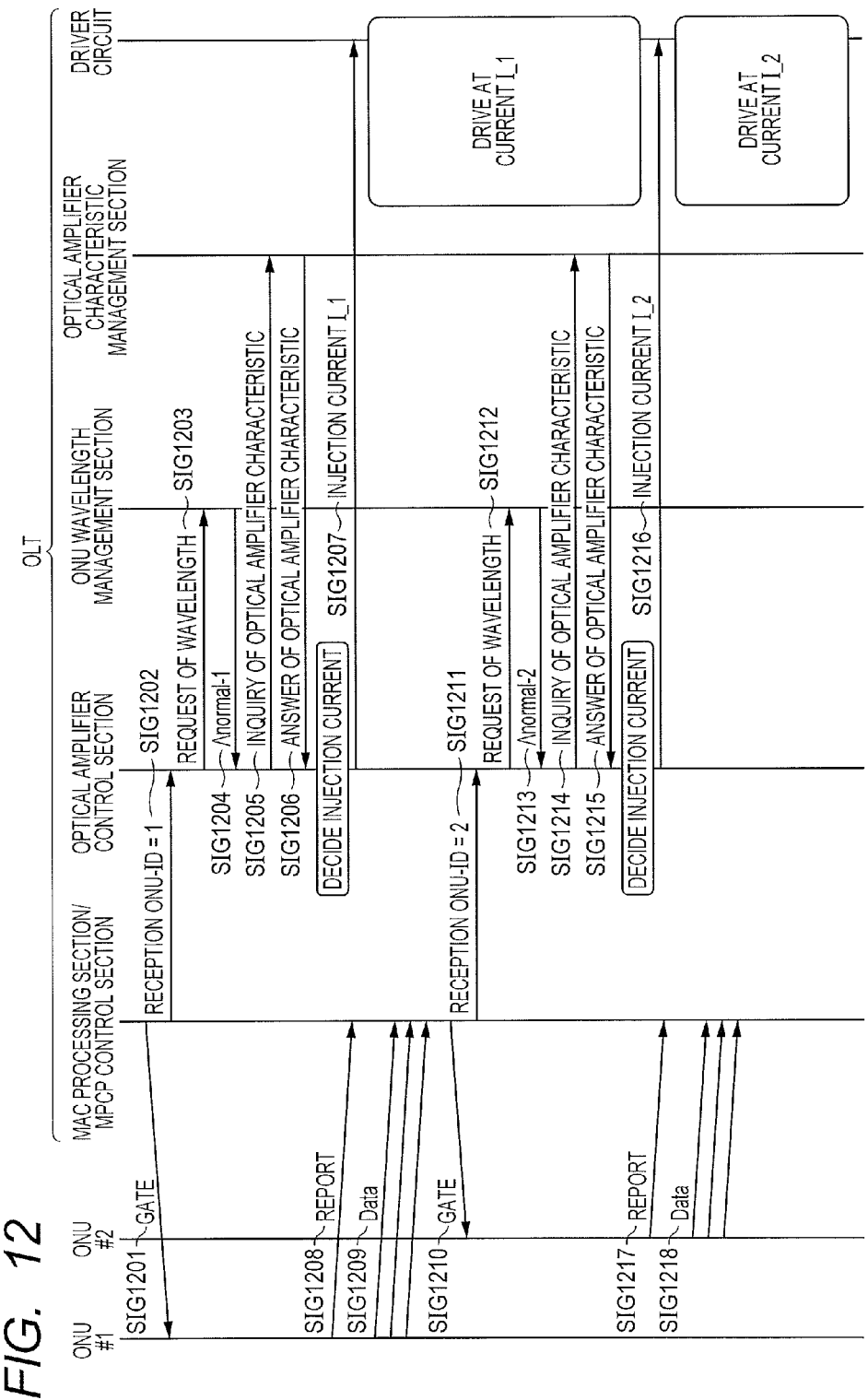
FIG. 12 is an example of a sequence at the time of normal transfer in the first embodiment of the present invention.

FIG. 12 shows an operation sequence at the time of the normal transmission in the first embodiment of the present invention. In this sequence, only components necessary to explain operations in the normal transmission among the components of the OLT are depicted. Moreover, in order to simplify the explanation, let it be assumed that only two ONU's, ONU1 and ONU2, are connected.

First, the MPCP control section 51 transmits to ONU1 a GATE message that gives ONU1 permission of uplink transmission (SIG1201). After that, the MPCP control section 51 notifies the optical amplifier control section 241 of ONU-ID=1 that is an identifier of ONU1 (SIG1202).

The optical amplifier control section 241 inquires of the ONU wavelength management section 260 as to the ONU transmission wavelength corresponding to the notified ONU-ID=1 (SIG1202). The ONU wavelength management section 260 that received the inquiry notifies a wavelength Λnormal-1 corresponding to ONU-ID=1 to the optical amplifier control section 241 (SIG1204). The optical amplifier control section 241 inquires of the optical amplifier characteristic management section 250 as to the optical amplifier characteristic corresponding to the acquired ONU transmission wavelength Λnormal-1 (SIG1205). The optical amplifier characteristic management section 250 notifies the optical amplifier gain at an injection current applicable to the wavelength Λnormal-1 on each polarization condition to the optical amplifier control section (SIG1206). The optical amplifier control section 241 decides injection current information I1 based on the acquired optical amplifier characteristic and a gain that is intended to be set, and outputs the decided injection current information I1 to the driver circuit (SIG1207).

The driver circuit 230 injects a current into the optical amplifier based on the inputted injection current information. A current I1 is injected into the optical amplifier, which amplifies the optical signal by an amplification factor close to a gain being set at the time of optical reception from ONU1. After that, the signal comprised of the REPORT signal and data from ONU1 is sent to the MAC processing section or the MPCP control section 51 via the optical amplifier, the burst-mode receiver, and the PHY processing section (SIG1208, SIG1209).

Next, the MPCP control section 51 transmits to ONU2 the GATE message that gives ONU2 permission of uplink transmission (SIG1210). After that, the MPCP control section 51 notifies the optical amplifier control section 241 of ONU-ID=2 that is an identifier of ONU2 (SIG1211).

The optical amplifier control section 241 inquires of the ONU wavelength management section 260 as to the ONU transmission wavelength corresponding to the notified ONU-ID=2 (SIG1214). The ONU wavelength management section 260 that received the inquiry notifies a wavelength Λnormal-2 corresponding to ONU-ID=2 to the optical amplifier control section 241 (SIG1213). The optical amplifier control section 241 inquires of the optical amplifier characteristic management section 250 as to the optical amplifier characteristic corresponding to the acquired ONU transmission wavelength Λnormal-2 (SIG1214). The optical amplifier characteristic management section 250 notifies the optical amplifier gain at the injection current applicable to the wavelength Λnormal-2 on each polarization condition to the optical amplifier control section (SIG1215). The optical amplifier control section 241 decides injection current information I2 based on the acquired optical amplifier characteristic and a gain that is intended to be set, and outputs the decided injection current information I2 to the driver circuit (SIG1216).

The driver circuit 230 injects a current into the optical amplifier based on the inputted injection current information. A current I2 is injected into the optical amplifier, which amplifies the optical signal by the amplification factor close to a gain being set at the time of the optical reception from ONU2.

The MPCP control section 51 decides a timing at which the reception ONU-ID is notified to the optical amplifier control section 241 as follows. In order to receive the optical signal normally from the ONU, it is necessary to adjust the injection current before receiving it. More strictly, it is necessary to adjust the injection current before termination of a preamble period of the burst signal. Here, a time after the optical amplifier control section receives the notification of the reception ONU-ID until injection current adjustment of the optical amplifier is completed is designated as an optical amplifier gain adjustment time. Therefore, the MPCP control section 51 must notify the reception ONU-ID earlier than a time to start receiving the optical signal by the optical amplifier gain adjustment time or more. Incidentally, although the MPCP control section notifies the reception ONU-ID after sending out the GATE message in FIG. 12, it may notify the reception ONU-ID before sending out the GATE massage when the optical amplifier gain adjustment time is long.

As described above, the current I1 is injected into the optical amplifier at the time of receiving the optical signal from ONU1, and the current I2 is injected into it at the time of receiving the optical signal from ONU2. Therefore, since the injection current is adjusted according to the wavelength for each ONU, the optical amplifier can receive with an almost constant gain even when the optical amplifier gain has the wavelength dependency.

[Example of Operation Sequence at the Time of Discovery in the First Embodiment]

Figure 13:
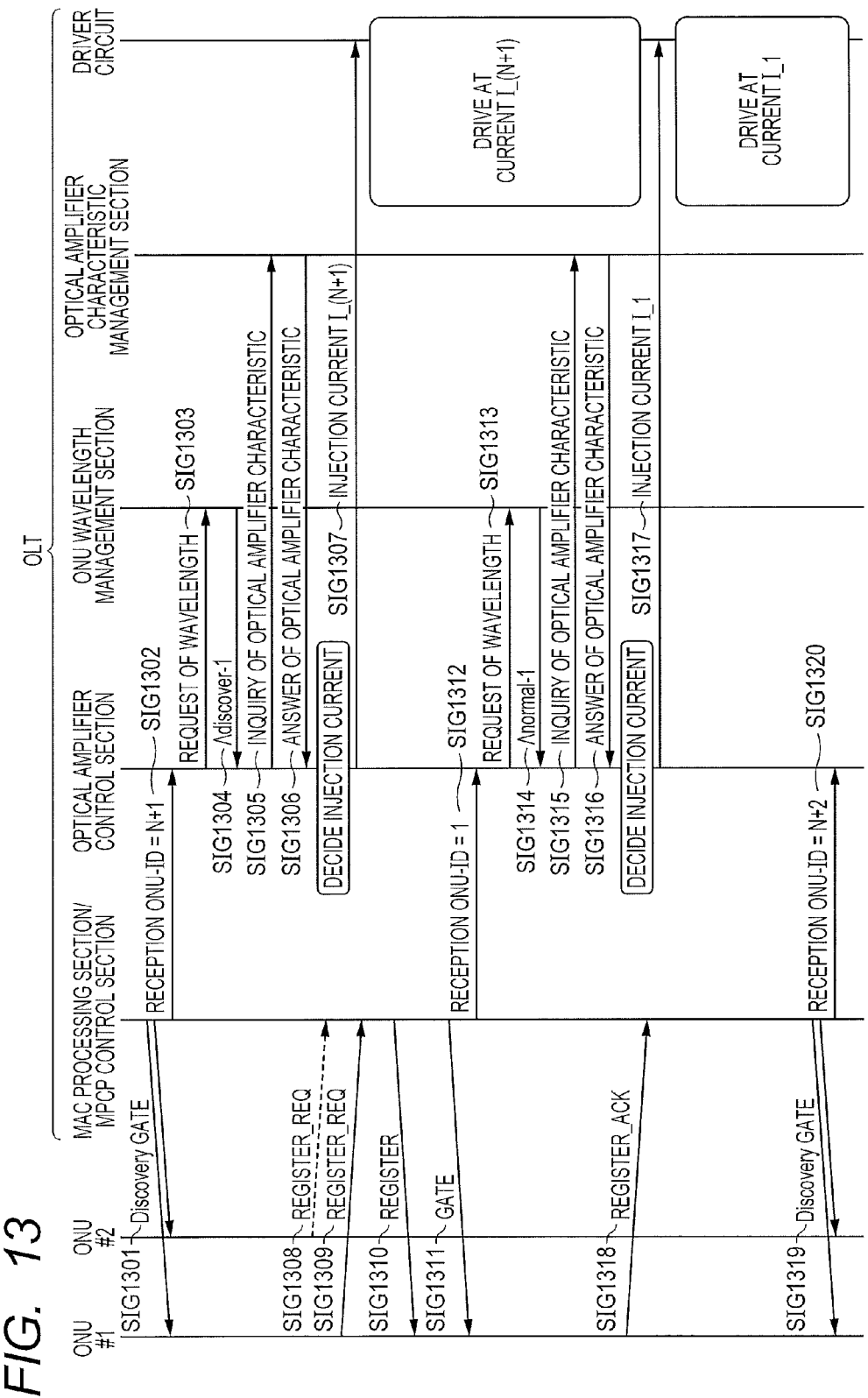
FIG. 13 is an example of a sequence at the time of Discovery in the first embodiment of the present invention

In the first embodiment, since the ONU that receives at the time of Discovery is not known in advance, a different operation from one at the time of normal transfer is needed. FIG. 13 shows an operation sequence at the time of Discovery in the first embodiment of the present invention. In this sequence, only components necessary to explain operations at the time of Discovery among the components of the OLT are depicted. Moreover, in order to simplify the explanation, the explanation will be given assuming that only two ONU's, ONU1 and ONU2, are connected. Incidentally, let it be assumed that registration of neither ONU1 nor ONU2 has not been completed at the start time of this sequence.

First, the OLT sends out DiscoveryGATE from the MPCP control section 51 to all the ONU's by broadcasting (SIG1301). Next, the MPCP control section 51 notifies reception ONU-ID=N+1 to the optical amplifier control section 241 (SIG1302). Note that N+1 is not an ONU-ID corresponding to an existing ONU but an ONU-ID used for Discovery. The optical amplifier control section 241 inquires of the ONU wavelength management section 260 as to the ONU transmission wavelength corresponding to the notified ONU-ID=N+1 (SIG1303). The ONU wavelength management section 260 that received the inquiry notifies a wavelength Λdiscover-1 corresponding to ONU-ID=N+1 to the optical amplifier control section 241 (SIG1304).

The optical amplifier control section 241 inquires of the optical amplifier characteristic management section 250 as to the optical amplifier characteristic corresponding to the acquired ONU transmission wavelength Λdiscover-1 (SIG1305). The optical amplifier characteristic management section 250 notifies the optical amplifier gain at an injection current applicable to the wavelength Λdiscover-1 on each polarization condition to the optical amplifier control section (SIG1306). The optical amplifier control section 241 decides injection current information I_(N+1) based on the acquired optical amplifier characteristic and a gain that is intended to be set, and outputs the decided injection current information I_(N+1) to the driver circuit (SIG1307).

The driver circuit 230 injects a current into the optical amplifier based on the inputted injection current information. A current I_(N+1) is injected into the optical amplifier, which amplifies the optical signal with the injection current that becomes optimum when the transmission wavelength is Λdiscover-1. Because of this, when the transmission wavelength of the ONU is close to Λdiscover-1, an amplification gain of the optical signal becomes close to the gain being set, and therefore it can be received. In this embodiment, let it be assumed that although the transmission wavelength of ONU1 is close to Λdiscover-1, the transmission wavelength of ONU2 is different from Λdiscover-1 greatly. When unregistered ONU1 and ONU2 receive DiscoveryGATE, each of them transmits REGISTER_REQ after waiting only a random time, respectively (SIG1308, SIG1309). These optical signals are sent to the MAC processing section or the MPCP control section 51 via the optical amplifier, the burst-mode receiver, and the PHY processing section. Although REGISTER_REQ is received from both ONU1 and ONU2, it can be normally received only from ONU1 that is an ONU whose transmission wavelength is close to Λdiscover-1. Accordingly, the MPCP control section 51 receives only REGISTER_REQ from ONU1.

The MPCP control section 51 transmits REGISTER and GATE to ONU1 from which REGISTER_REQ is received (SIG1310, SIG1311). Moreover, the MPCP control section 51 examines the ONU-ID of ONU1 that is an ONU to which GATE is destined to be transmitted. Incidentally, if the MAC address of the ONU is used as the ONU-ID, a destination MAC address of GATE will serve as the ONU-ID as it is. Here, let it be assumed that the ONU-ID of ONU1 is unity. The MPCP control section 51 notifies the optical amplifier control section 241 of ONU-ID=1 that is an identifier of ONU1 (SIG1312). The optical amplifier control section 241 inquires of the ONU wavelength management section 260 as to the ONU transmission wavelength corresponding to the notified ONU-ID=1 (SIG1313).

The ONU wavelength management section 260 that received the inquiry notifies the wavelength Λnormal-1 corresponding to ONU-ID=1 to the optical amplifier control section 241 (SIG1314). The optical amplifier control section 241 inquires of the optical amplifier characteristic management section 250 as to the optical amplifier characteristic corresponding to the acquired ONU transmission wavelength Λnormal-1 (SIG1315). The optical amplifier characteristic management section 250 notifies the optical amplifier gain at the injection current applicable to the wavelength Λnormal-1 on each polarization condition to the optical amplifier control section (SIG1316). The optical amplifier control section 241 decides the injection current information I1 based on the acquired optical amplifier characteristic and a gain that is intended to be set, and outputs the decided injection current information I1 to the driver circuit (SIG1317). The driver circuit 230 injects a current into the optical amplifier based on the inputted injection current information. The current I1 is injected into the optical amplifier, which amplifies the optical signal by the amplification factor close to a gain being set at the time of the optical reception from ONU1. After that, ONU1 transmits REGISTER_ACK in a period assigned by GATE (SIG1311) (SIG1318). Since when receiving this REGISTER_REQ, the current is set to the injection current I1 optimum for the wavelength coming from ONU1, normal reception is possible.

The above is the operations of one cycle of Discovery. In the first embodiment of the present invention, the above is repeated for M times in which the ONU-ID changes like N+1, N+2, ..., N+M. This is because since at the time of Discovery, the ONU transmission wavelength is not known in advance, the optical amplifier is set up with an optimum injection current with respect to M kinds of transmission wavelengths, whereby it becomes possible to register any ONU of whatever transmission wavelength. Incidentally, an order of Discovery and the normal transmission is that M times of Discovery and the normal transmissions are alternately repeated, for example. Alternatively, the repetition may be as follows: Discovery#1, normal transmission, Discovery#2, normal transmission, ..., Discovery#M, and normal transmission.

Effect in the First Embodiment

As described above, by adjusting the injection current for every wavelength of the received burst signal, it is possible to keep a gain of the optical amplifier almost constant without depending on the wavelength even when the wavelength of the received burst signal varies for every ONU. Accordingly, the receivable range at each signal wavelength when the present invention is applied can be made as shown in FIG. 10.

Figure 10:
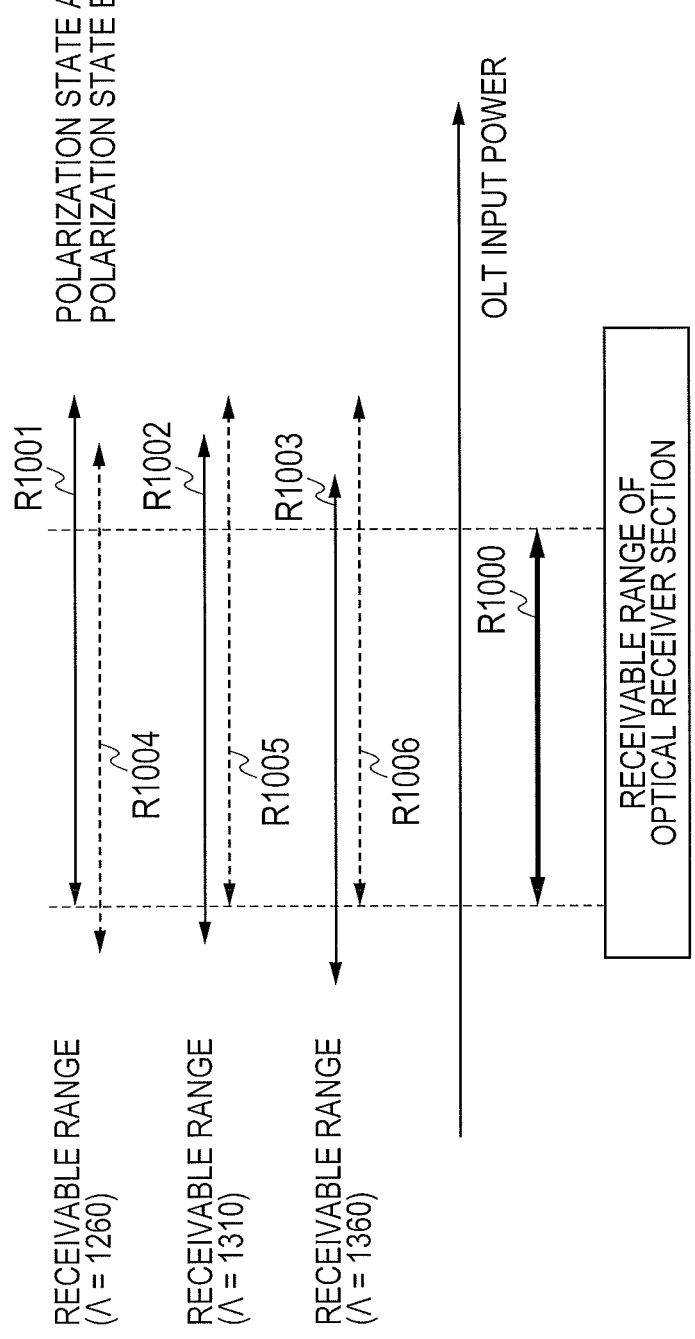
FIG. 10 shows a receivable range in the optical receiver section in the present invention.

FIG. 10 shows a receivable range at each signal wavelength in the case where the injection current is adjusted for each ONU transmission wavelength. The figure shows receivable ranges when optical signals whose transmission wavelengths are 1360 nm, 1310 nm, and 1260 nm and whose polarization directions are two kinds of A and B are received. In the embodiment of the present invention, the gain of the polarization direction whose gain is smaller than that of the other polarization direction at each wavelength is controlled so as to be constant. Because of this, a receivable range R1001 at a wavelength of 1360 nm in the polarization state A, a receivable range R1005 at a wavelength of 1310 nm in the polarization state B, and a receivable range R1006 at a wavelength of 1260 nm in the polarization state B have basically become identical. Accordingly, the receivable ranges of the respective wavelengths overlap roughly, and therefore the receivable range in the optical receiver section can be kept wide.

Therefore, even when the wavelength differs for every ONU and the gain of the optical amplifier is dependent on the wavelength and the polarization direction, it is possible to keep the receivable range of the optical receiver section in a wide state.

Second Embodiment

Next, a second embodiment of the present invention will be described. The explanation will be given focusing on a difference with respect to the first embodiment. In the second embodiment, the optical receiver section has a variable attenuator, and an amount of attenuation of the variable attenuator is adjusted for every transmission wavelength of the ONU.

[Configuration of Optical Receiver Section in the Second Embodiment]

Figure 14:
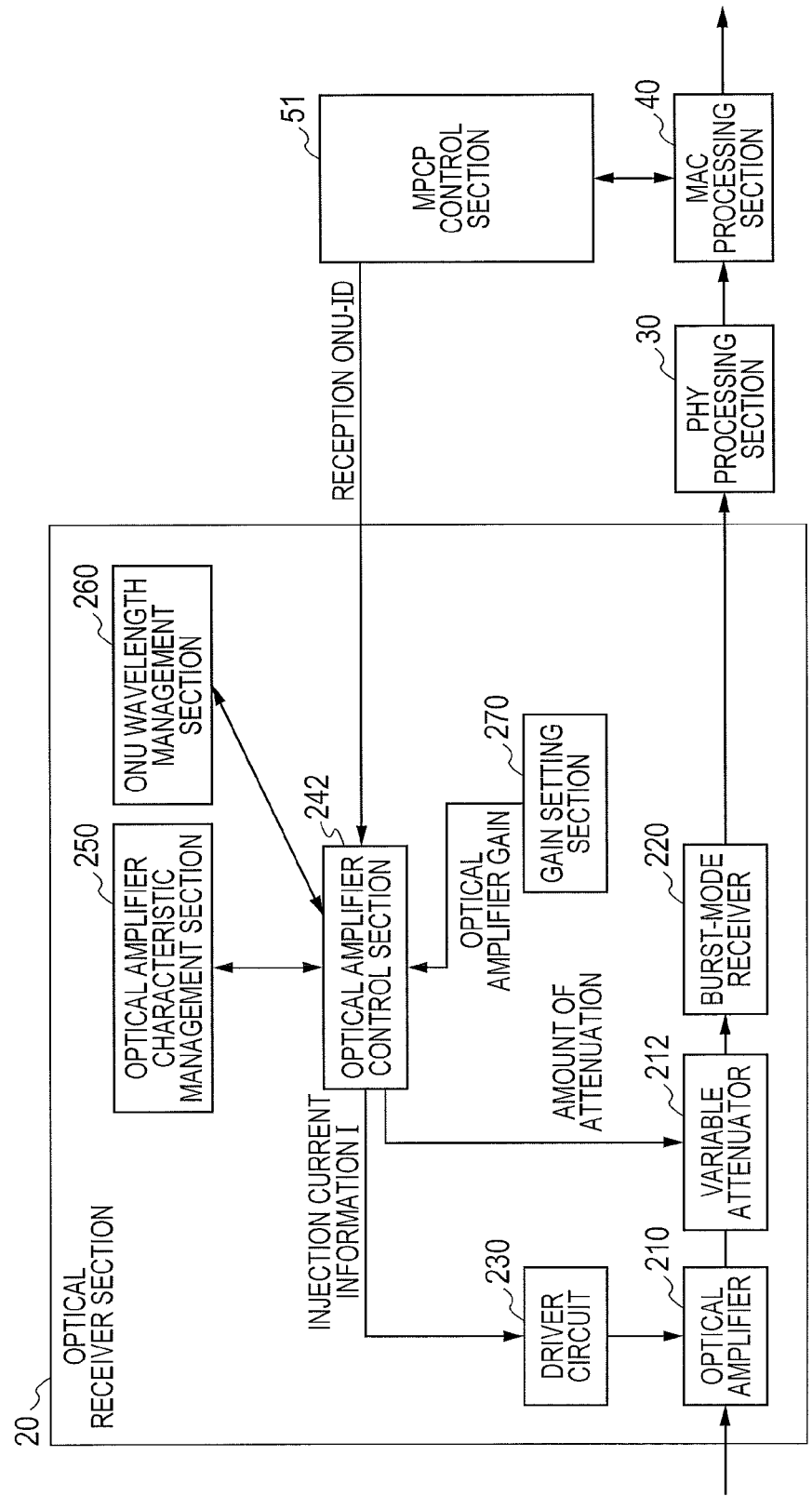
FIG. 14 is a configuration of an optical receiver section in a second embodiment of the present invention.

A configuration of an optical receiver section in a second embodiment will be explained using FIG. 14. Differences with respect to the first embodiment exist in a point of having a variable attenuator 212 and a point that an optical amplifier control section 242 can control the amount of attenuation of the variable attenuator 212.

The variable attenuator 212 attenuates the optical signal that was inputted from the optical amplifier 210 based on the amount of attenuation directed by the optical amplifier control section 242, and outputs the attenuated optical signal into the burst-mode receiver 220.

Based on the optical amplifier gain acquired from the gain setting section 270, the reception ONU-ID acquired from the MPCP control section 51, the wavelength information acquired from the ONU wavelength management section 260, and the optical amplifier characteristic information acquired from the optical amplifier characteristic management section 250, the optical amplifier control section 242 decides the injection current and the amount of attenuation, and outputs the injection current information I representing the amount of injection current to the driver circuit 230. Moreover, it outputs the amount of attenuation to the variable attenuator 212. Incidentally, in the second embodiment, the injection current shall be a constant value (I_a), and the amount of attenuation is made to vary.

[Operations of Optical Amplifier Control Section in the Second Embodiment]

Operations of the optical amplifier control section 242 in the second embodiment will be explained in detail. Incidentally, while in the first embodiment, an optimum amount of injection current to the optical amplifier is calculated from the reception ONU-ID; in the second embodiment, an optimum amount of attenuation of the variable attenuator is calculated from the reception ONU-ID.

Figure 15:
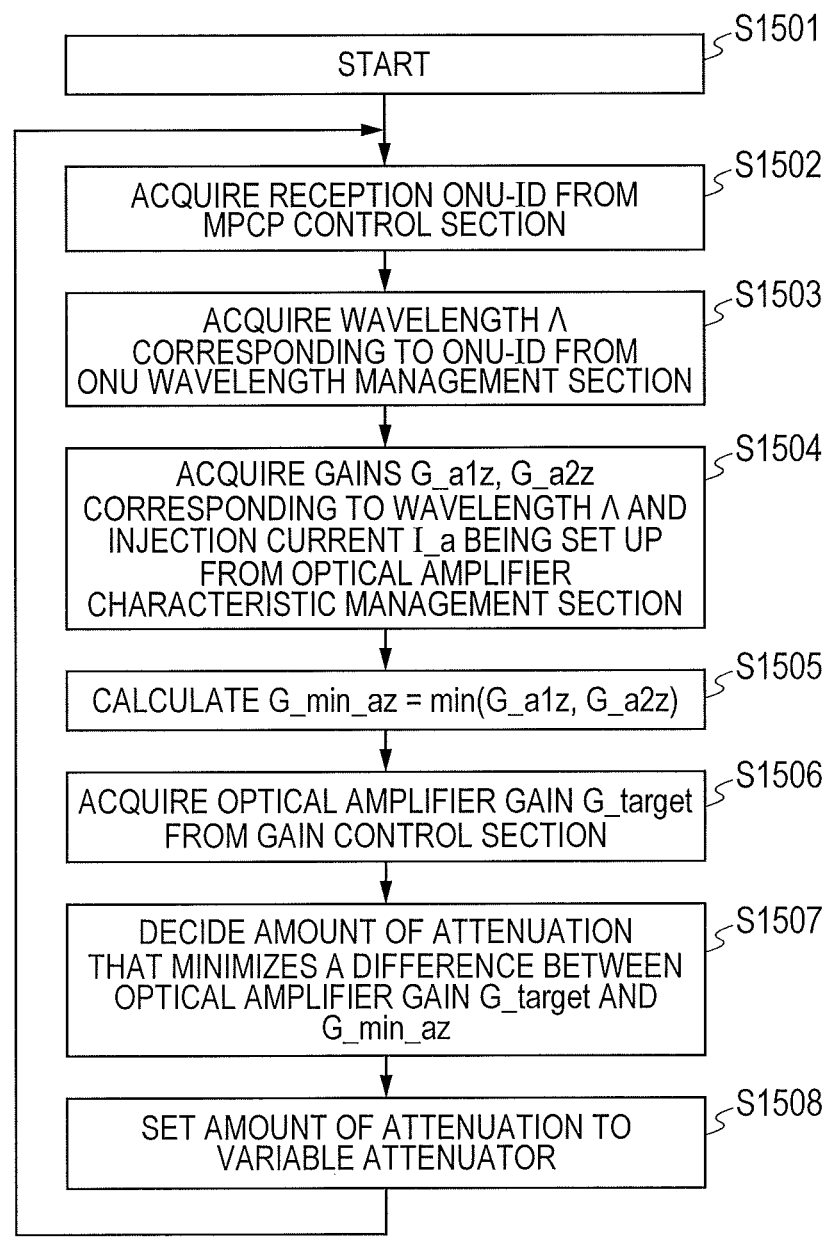
FIG. 15 is a flowchart showing operations of the optical amplifier control section in the second embodiment of the present invention.

FIG. 15 shows a flowchart showing operations of the optical amplifier control section in the second embodiment. At S1501, the operation of the optical amplifier control section is started, and the process moves to S1502. At S1502, the optical amplifier control section acquires the reception ONU-ID from the MPCP control section 51, and the process moves to S1503. At S1503, the optical amplifier control section inquires of the ONU wavelength management section 260 as to the wavelength corresponding to the acquired reception ONU-ID, and acquires the wavelength corresponding to the ONU-ID. Upon reception of the wavelength, the process moves to S1504. At S1504, the optical amplifier control section acquires a correspondence between the injection current I_a related to the acquired wavelength and the gains $G\_a1z$, $G\_a2z$. For example, when the wavelength is $\Lambda\_3$, $G\_a13$ and $G\_a13$ (a is a constant value) are acquired. Upon completion of the acquisition of the gain, the process moves to S1505. At S1505, the optical amplifier control section calculates the gain $G\_min\_az = \min(G\_a1z, G\_a2z)$ is calculated from the acquired $G\_a1z$, $G\_a2z$ Incidentally, the function $\min(A, B)$ returns a smaller value of A and B. Upon completion of the calculation, the process moves to S1506. At S1506, the optical amplifier control section acquires $G\_target$ that is the optical amplifier gain being intended to be set from the gain setting section 270, and the process moves to S1507. At S1507, the optical amplifier control section decides a difference between the optical amplifier gain $G\_target$ that is intended to be set and $G\_min\_az$ (x=1 to m) as the amount of attenuation. Upon completion of the decision of the amount of attenuation, the process moves to S1508. At S1508, the optical amplifier control section outputs the decided amount of attenuation to the variable attenuator. Upon completion of the output, the process returns to S1502. By repeating the steps of S1502 to S1508, it is possible to control the amount of attenuation of the variable attenuator based on the transmission wavelength of each ONU when receiving the optical signal from the each ONU.

Regarding setting of the injection current value of the optical amplifier in the second embodiment, supplementary information is given to explain it further. In the second embodiment, the injection current of the optical amplifier is constant and the amount of attenuation of the variable attenuator is adjusted based on the transmission wavelength of the ONU. For that purpose, the gain in the optical amplifier needs to be equal to or more than $G\_target$ at whatever wavelength in whichever polarization direction, and the amount of injection current is set up so as to satisfy this.

[Example of Operation Sequences at the Time of Normal Transmission and at the Time of Discovery in the Second Embodiment]

The operation sequences at the time of the normal transmission and at the time of Discovery in the second embodiment are almost the same as the operation sequences of the first embodiment. What is necessary is just to replace an operation of deciding the injection current and notifying the injection current to the driver circuit in the first embodiment with an operation of deciding the amount of attenuation and notifying the amount of attenuation to the variable attenuator in the second embodiment.

Effect in the Second Embodiment

Also in the second embodiment, by adjusting the variable amount of attenuation for every wavelength of the received burst signal, it is possible to keep the overall gain that is a sum of the gain of the optical amplifier and the amount of attenuation of the variable attenuator almost constant without depending on the wavelength even when the wavelength of the received burst signal varies for every ONU. Accordingly, also in the second embodiment, the receivable range of the optical receiver section can be kept in a wide state, similarly with the first embodiment.

Moreover, in the first embodiment, the processing of deciding the amount of injection current in the optical amplifier control section requires calculating the gain at each injection current and deciding an optimum injection current, and therefore the determination method is slightly complicated. Since in the second embodiment, the processing of deciding the amount of attenuation in the optical amplifier control section is only to calculate a difference of $G\_min\_az$ and $G\_target$, the determination of the amount of attenuation becomes simple. Therefore, since the processing in the optical amplifier control section can be simplified, it is possible to reduce a circuit scale and to shorten the processing time in the optical amplifier control section.

Third Embodiment

Next, a third embodiment of the present invention will be described. The explanation will be given focusing on a difference with respect to the first embodiment. In the third embodiment, instead of negating the need for the ONU wavelength management section, a wavelength detection section is provided, a wavelength is detected from the received optical signal, and the injection current of the optical amplifier is adjusted based on the detected wavelength.

[Configuration of Optical Receiver Section in the Third Embodiment]

Figure 16:
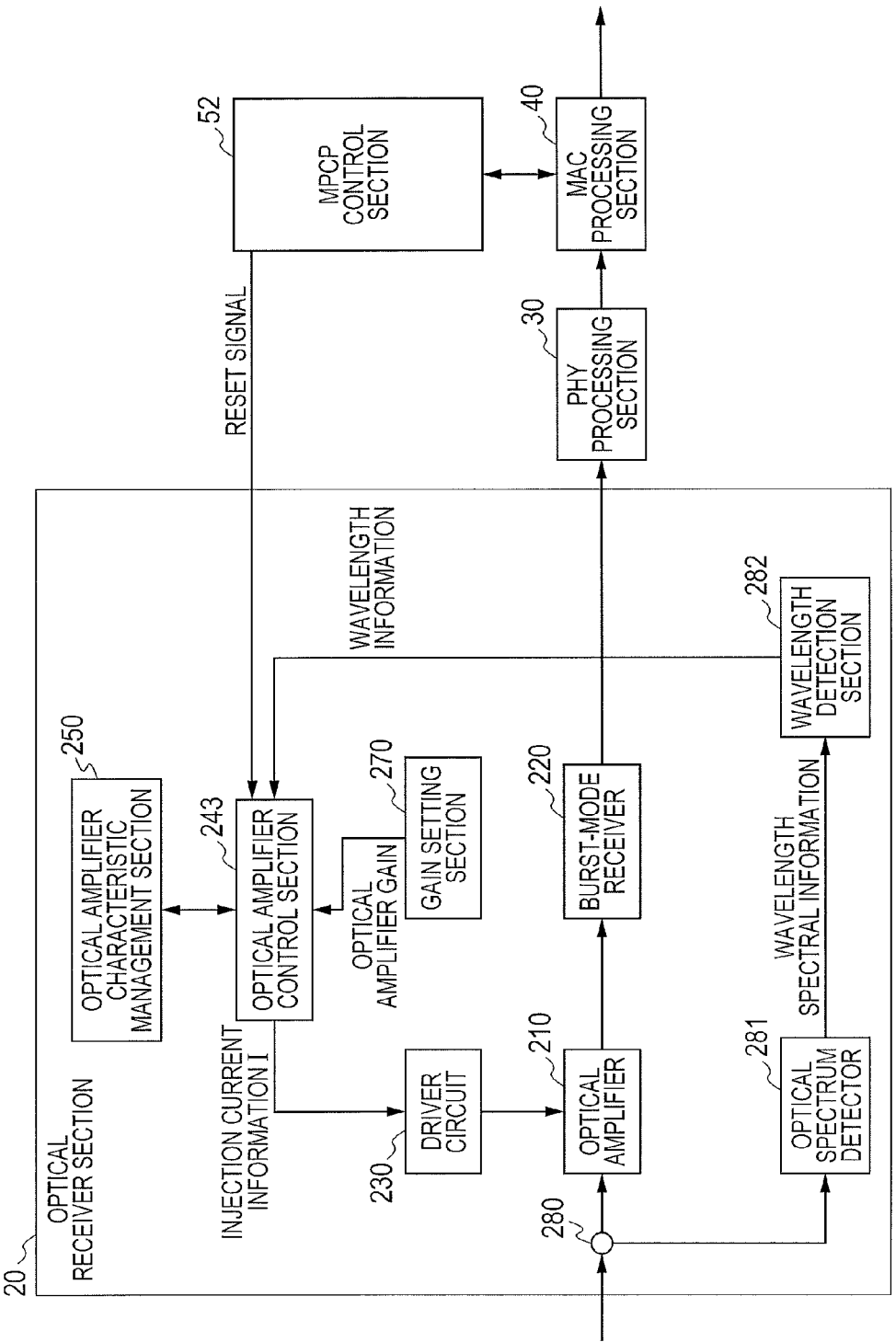
FIG. 16 is a configuration of an optical receiver section in a third embodiment of the present invention.

FIG. 16 shows a configuration of an optical receiver section 20 in the third embodiment of the present invention. Differences with respect to the first embodiment are a point of not having the ONU wavelength management section and a point of having an optical splitter 280, an optical spectrum detector 281, and a wavelength detection section 282. Moreover, this configuration includes an optical amplifier control section 243 and an MPCP control section 52 that are different from those of the first embodiment in respective functions.

Since operations of the optical amplifier 210, the driver circuit 230, the burst-mode receiver 220, the PHY processing section 30, the MAC processing section 40, the optical amplifier characteristic management section 250, and the gain setting section 270 are the same as those of the first embodiment, respectively, their explanations are omitted.

The optical splitter 280 distributes the inputted optical signal to the optical amplifier 210 and the optical spectrum detector 281. A ratio of distribution does not need to be 50% each. For example, the ratio of distribution may be 90% to the optical amplifier 210 and 10% to the optical spectrum detector 281. By modifying the ratio in this way, the ratio of the optical power inputted into the optical amplifier 210 is raised, and degradation of a minimum receive sensitivity of the optical receiver section caused by introducing the splitter 280 is prevented.

The optical spectrum detector 281 detects a wavelength spectrum of the inputted optical signal, and outputs wavelength spectral information to the wavelength detection section 282. Here, the wavelength spectral information is an optical strength for each wavelength. The optical spectrum detector is comprised of an element for dividing light directions for respective wavelengths and multiple photodetectors, and obtains a wavelength spectrum by light intensities detected by the respective photodetectors.

Based on the wavelength spectrum inputted from the optical spectrum detector, the wavelength detection section 282 decides the wavelength of the optical signal inputted into the optical amplifier 210, and outputs the decided wavelength information to the optical amplifier control section 243. Since optical strength of each wavelength is known from the wavelength spectral information, the wavelength of the optical signal may be decided to be a wavelength at which the optical strength is maximized.

The MPCP control section 52 outputs a reset signal to the optical amplifier control section 243 exactly at a receiving timing of the burst optical signal. The receiving timing of the burst optical signal can be calculated based on time information of the GATE message that specifies a transmission time to the ONU.

Based on the optical amplifier gain acquired from the gain setting section 270, the wavelength information acquired from the wavelength detection section 282, and the optical amplifier characteristic information acquired from the optical amplifier characteristic management section 250, the optical amplifier control section 243 decides the injection current, and outputs the injection current information I representing the amount of injection current to the driver circuit 230. Moreover, based on the reset signal acquired from the MPCP control section 52, it sets the injection current information to a default current value I_default. A method for determining the injection current of the optical amplifier control section 243 will be described later.

[Operations of Optical Amplifier Control Section in the Third Embodiment]

Operations of the optical amplifier control section 243 in the third embodiment will be explained in detail. Note that, while in the first embodiment, the optimum amount of injection current to the optical amplifier is calculated from the reception ONU-ID; in the third embodiment, the optimum amount of injection current is calculated based on the wavelength acquired from the wavelength detection section.

Figure 17:
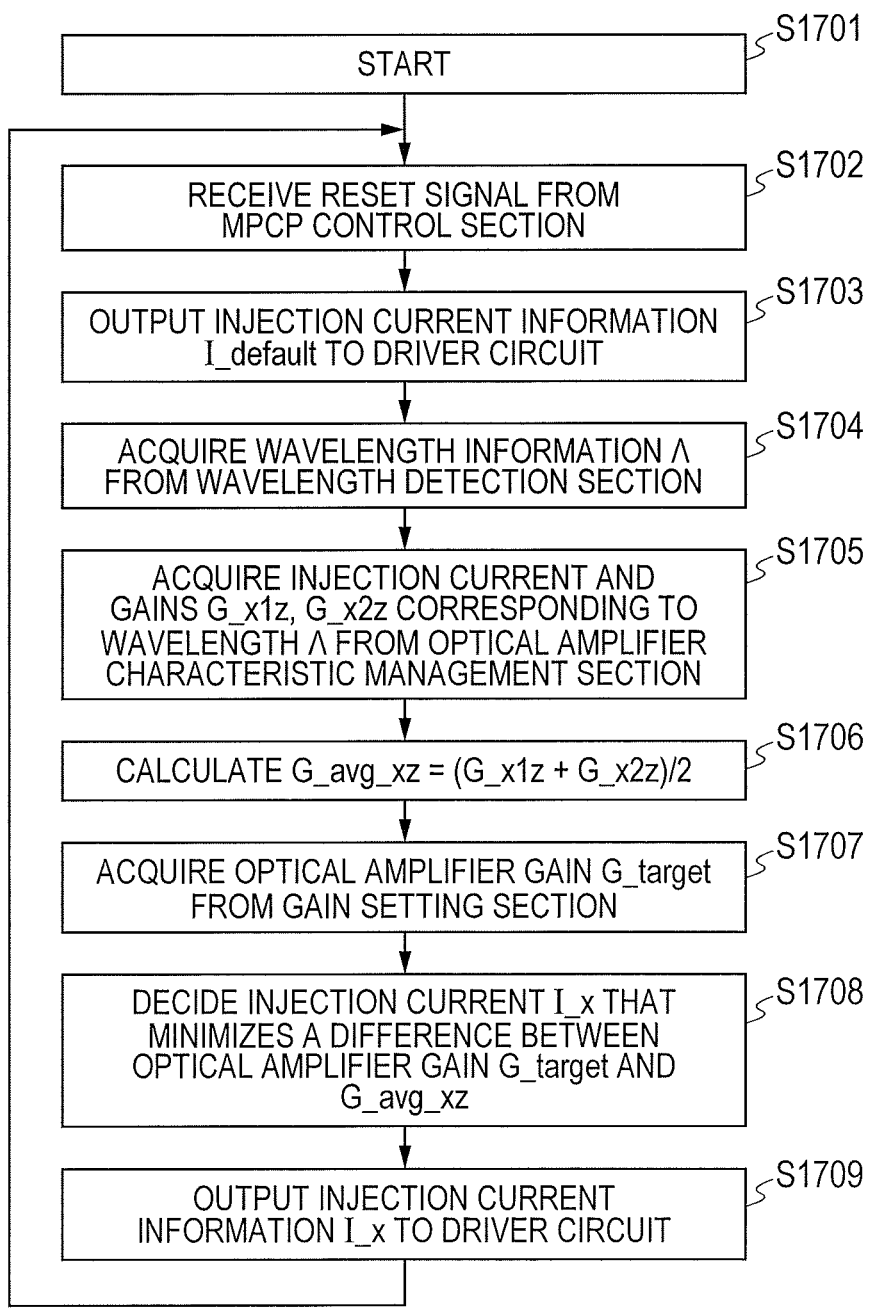
FIG. 17 is a flowchart showing operations of the optical amplifier control section in the third embodiment of the present invention.

FIG. 17 shows a flowchart showing operations of the optical amplifier control section in the third embodiment. The operation of the optical amplifier control section is started at S1701, and the process moves to S1702. At S1702, the optical amplifier control section receives the reset signal from the MPCP control section 52, and the process moves to S1703. At S1703, in order to set the current to a default injection current, the optical amplifier control section outputs the injection current information I_default to the driver circuit, and the process moves to S1704. At S1704, the optical amplifier control section acquires the wavelength information Λ from the wavelength detection section, and the process moves to S1705. Operations of S1705 to S1709 are the same as the operations (S1104 to S1108 of FIG. 11) in the first embodiment. When the output to the driver circuit is completed at S1709, the process returns to S1702. By repeating the steps of S1702 to S1709, it is possible to control the injection current based on the transmission wavelength of each ONU when receiving the optical signal from the each ONU.

[Example of Operation Sequence at the Time of Normal Transmission in the Third Embodiment]

Operations at the time of uplink transmission between the ONU and the OLT in the third embodiment of the present invention will be explained. Here, the explanation will be given dividing the operations into those at the time of the normal transmission and those at the time of the Discovery operation.

Figure 18:
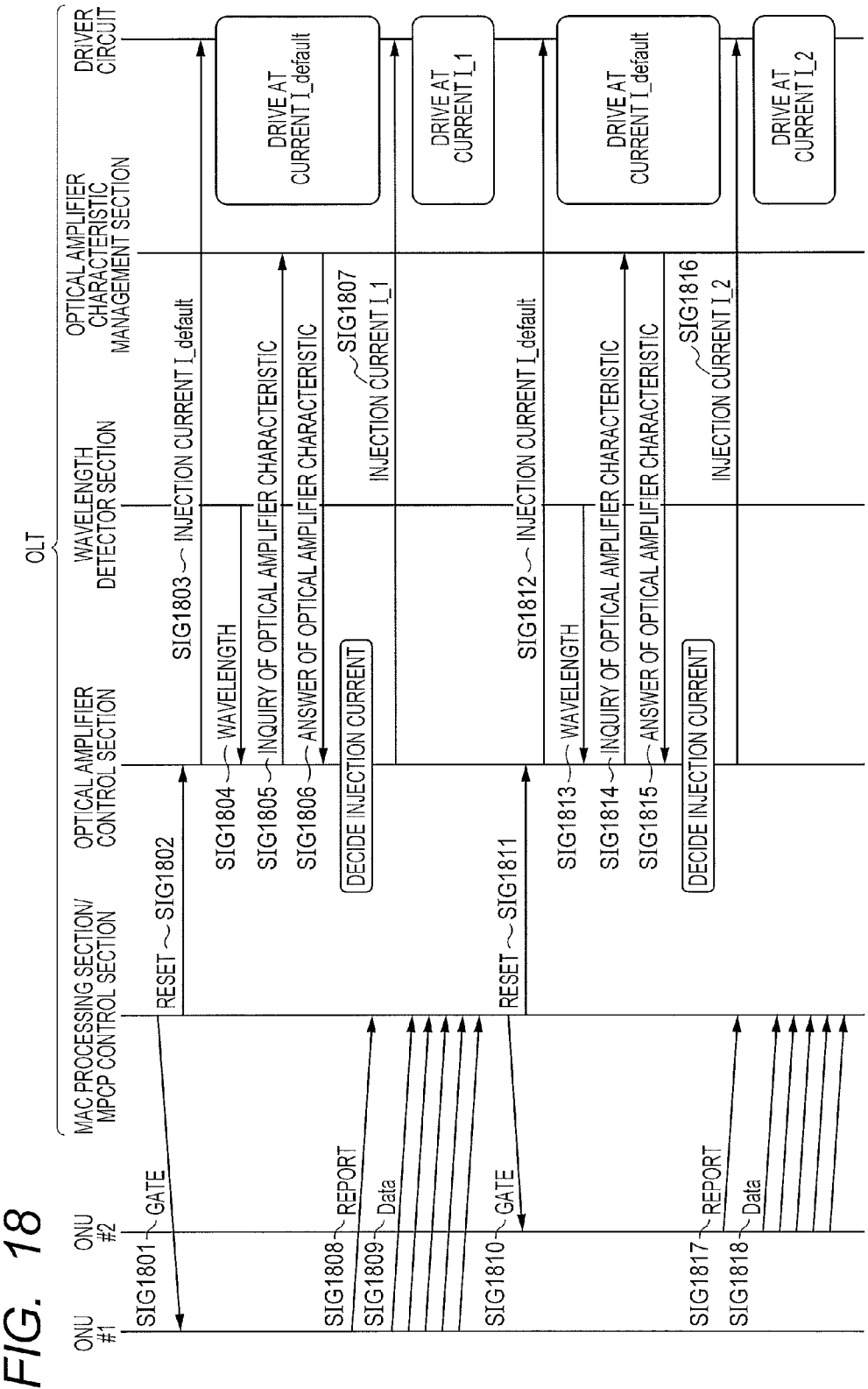
FIG. 18 is an example of a sequence at the time of normal transmission in the third embodiment of the present invention.

FIG. 18 shows an operation sequence at the time of the normal transmission in the third embodiment of the present invention. In this sequence, only components necessary to explain operations in the normal transmission among the components of the OLT are depicted. Moreover, in order to simplify the explanation, the explanation will be given assuming that only two ONU's, ONU1 and ONU2, are connected.

First, the MPCP control section 52 transmits ONU1 the GATE message that gives ONU1 permission of uplink transmission (SIG1801). After that, the MPCP control section 52 outputs the reset signal to the optical amplifier control section 243 (SIG1802).

Upon reception of the reset signal, the optical amplifier control section 243 outputs default injection current information I_default to the driver circuit 230 (SIG1803). The driver circuit 230 injects a current I_default into the optical amplifier based on the inputted injection current information. As a result, the optical amplifier performs a default operation. After that, the optical amplifier control section 243 acquires the wavelength information from the wavelength detection section 282 (SIG1804). Furthermore, it inquires of the optical amplifier characteristic management section 250 as to the optical amplifier characteristic corresponding to the acquired ONU transmission wavelength (SIG1805). The optical amplifier characteristic management section 250 notifies the optical amplifier gain at an injection current applicable to the wavelength on each polarization condition to the optical amplifier control section (SIG1806). The optical amplifier control section 243 decides the injection current information I1 based on the acquired optical amplifier characteristic and a gain that is intended to be set, and outputs the decided injection current information I1 to the driver circuit (SIG1807).

The driver circuit 230 injects a current into the optical amplifier based on the inputted injection current information. The current I1 is injected into the optical amplifier, which amplifies the optical signal by the amplification factor close to a gain being set at the time of the optical reception from ONU1. After that, a signal comprised of a REPORT signal and data from ONU1 is sent to the MAC processing section or the MPCP control section 51 via the optical amplifier, the burst-mode receiver, and the PHY processing section (SIG1808, SIG1809).

Here, regarding operations in a period of SIG1802 to SIG1808 on this sequence, supplementary information will be given. In this sequence, although it is seen as if the wavelength is acquired from the wavelength detection section before the OLT receives the optical signal comprised of REPORT and Data from ONU1, actually preamble reception of the burst optical signal is started before the wavelength is detected at SIG1804, and in a period in which a preamble part of the burst signal is being received, the wavelength is detected and adjustment of the injection current is completed. After that, after receiving a payload part, REPORT is received in the MPCP control section. A point of argument returns to the sequence explanation.

When the reception from ONU1 is completed, the operation shifts to receiving operations from ONU2.

The MPCP control section 52 transmits to ONU2 the GATE message that gives ONU2 permission of uplink transmission (SIG1810). After that, the MPCP control section 52 outputs the reset signal to the optical amplifier control section 243 (SIG1811).

Upon reception of the reset signal, the optical amplifier control section 243 outputs the default injection current information I_default to the driver circuit 230 (SIG1812). The driver circuit 230 injects the current I_default into the optical amplifier based on the inputted injection current information. As a result, the optical amplifier operates on a default condition. After that, the optical amplifier control section 243 acquires the wavelength information from the wavelength detection section 287 (SIG1813). Further, it inquires of the optical amplifier characteristic management section 250 as to the optical amplifier characteristic corresponding to the acquired ONU transmission wavelength (SIG1814). The optical amplifier characteristic management section 250 notifies the optical amplifier gain at an injection current applicable to the wavelength on each polarization condition to the optical amplifier control section (SIG1815). The optical amplifier control section 243 decides the injection current information I2 based on the acquired optical amplifier characteristic and a gain that is intended to be set, and outputs the decided injection current information I2 to the driver circuit (SIG1816).

The driver circuit 230 injects a current into the optical amplifier based on the inputted injection current information. The current I2 is injected into the optical amplifier, which amplifies the optical signal by the amplification factor close to a gain being set at the time of the optical reception from ONU2. After that, the signal comprised of the REPORT signal and the data coming from ONU2 is sent to the MAC processing section or the MPCP control section 51 via the optical amplifier, the burst-mode receiver, and the PHY processing section (SIG1817, SIG1818).

Since the above operations adjust the injection current according to the wavelength for every ONU, and therefore it can receive with an almost constant gain even when the optical amplifier gain has the wavelength dependency. A timing at which the MPCP control section 52 outputs the reset signal to the optical amplifier control section 244 is decided as below. In the third embodiment, in order to receive the optical signal normally from the ONU, it is necessary to restore the injection current to the default value before receiving it. For that reason, the MPCP control section 52 needs to output the reset signal before the optical signal starts to be received.

[Example of Operation Sequence at the Time of Discovery in the Third Embodiment]

Next, operations at the time of Discovery in the third embodiment will be explained. In the third embodiment, in order to detect the wavelength from the received optical signal and to adjust the injection current, the operation is the same between at the time of the normal transmission and at the time of Discovery. Therefore, the explanation using a sequence diagram is omitted.

[Control of Burst-Mode Receiver in the Third Embodiment]

The reset signal is inputted into the optical amplifier control section in the third embodiment. Among the burst-mode receivers, there is one that is made to return the gain etc. to its initial state by inputting the reset signal thereinto. For that reason, the reset signal may be inputted not only into the burst-mode receiver but also into the optical amplifier control section. Note that, in this case, in order to adjust the burst-mode receiver after the completion of the adjustment of the optical amplifier, a timing of resetting the optical amplifier control section is set prior to a reset timing of the burst-mode receiver.

Effect in the Third Embodiment

Also in the third embodiment, by adjusting the amount of injection current for every wavelength of the received burst signal, it is possible to keep the overall gain that is the sum of the gain of the optical amplifier and the amount of attenuation of the variable attenuator almost constant without depending on the wavelength even when the wavelength of the received burst signal varies for every ONU. Accordingly, also in the third embodiment, it is possible to keep the receivable range of the optical receiver section in a wide state, similarly with the first embodiment.

Although the first embodiment needs the ONU wavelength management section for managing the wavelength for every ONU, the third embodiment negates the need for it. Because of this, compared with the first embodiment, management of the ONU becomes easy. Moreover, since the MPCP control section should just output not the ONU-ID but the reset signal to the optical receiver section, control for every burst is simplified more. Furthermore, although the Discovery process needed to be performed M times in the first embodiment, only one time of performance may need to be done in the third embodiment. Therefore, uplink band utilization efficiency can be improved.

Fourth Embodiment

Next, a fourth embodiment of the present invention will be described. The explanation will be given focusing on a difference with respect to the third embodiment. In the fourth embodiment, instead of directly detecting the wavelength, the gain of the optical amplifier is detected, the wavelength of the received optical signal is estimated from the gain of the optical amplifier, and the injection current of the optical amplifier is adjusted based on the estimated wavelength.

[Configuration of Optical Receiver Section in the Fourth Embodiment]

Figure 19:
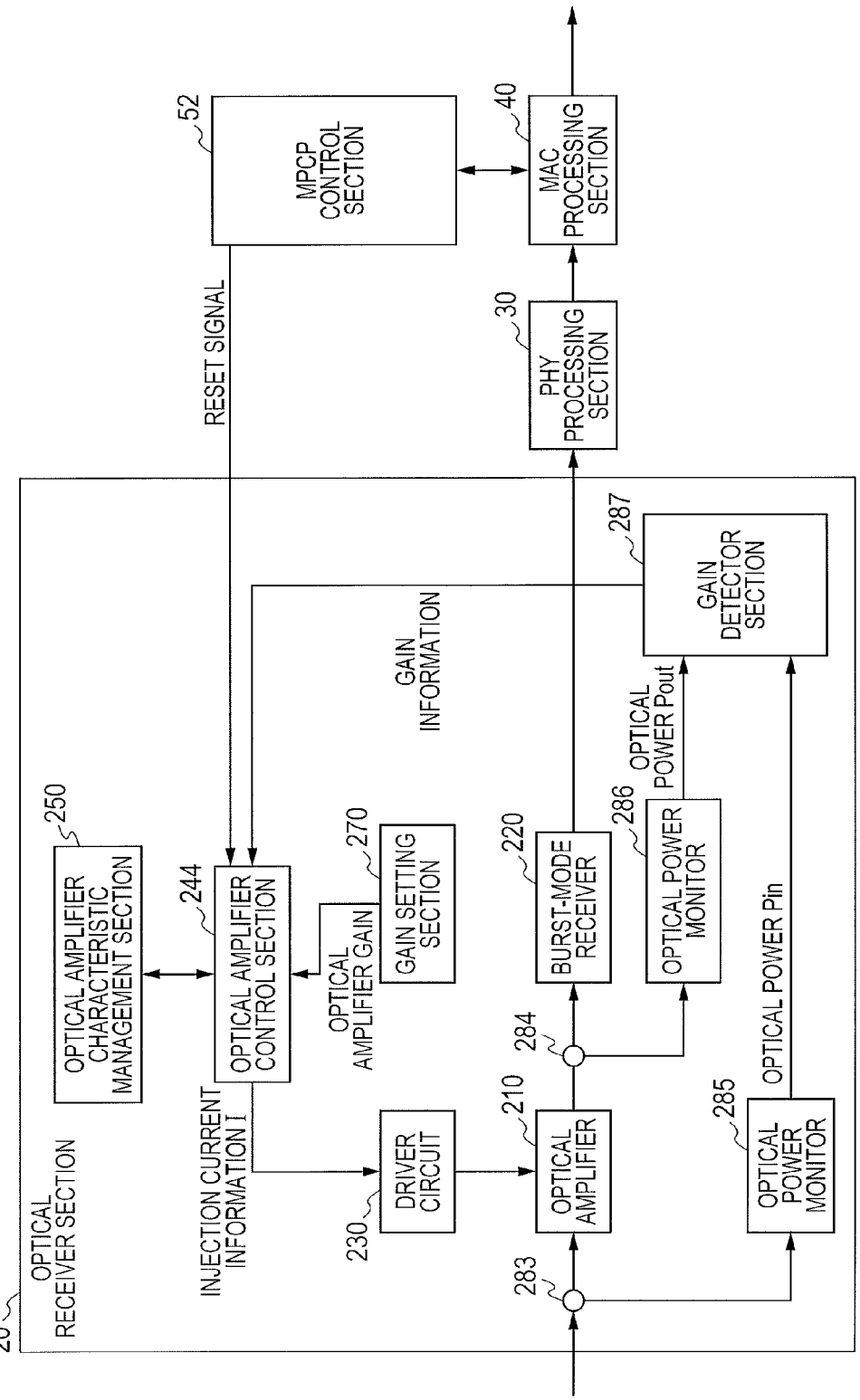
FIG. 19 is a configuration of an optical receiver section in a fourth embodiment of the present invention.

FIG. 19 shows a configuration of an optical receiver section 20 in the fourth embodiment of the present invention. The difference with respect to the third embodiment exists in a point of having optical power monitors 285, 286 and a gain detector section 287 instead of the optical spectral detection section and the wavelength detection section. Moreover, this configuration includes an optical amplifier control section 244 whose function is different from that of the third embodiment.

Since functions of the optical amplifier 210, the driver circuit 230, the burst-mode receiver 220, the PHY processing section 30, the MAC processing section 40, the MPCP control section 52, the optical amplifier characteristic management section 250, and the gain setting section 270 are the same as those of the third embodiment, their explanations are omitted.

An optical splitter 283 distributes the inputted optical signal into the optical amplifier 210 and an optical power monitor 285. The ratio of distribution does not need to be 50% each, and may be set to 90% to the optical amplifier 210 and 10% to the optical power monitor 285, for example. By setting in this way, the ratio of the optical power inputted into the optical amplifier 210 is raised, and degradation of the minimum receive sensitivity of the optical receiver section caused by introducing the optical splitter 283 is prevented.

The optical power monitor 285 detects the optical power of the inputted optical signal, and outputs a voltage signal proportional to the optical power to the gain detector section 287. The optical power monitor is comprised of a photodiode and a transimpedance amplifier, for example. Since the distribution ratio in the optical splitter 283 is constant, the output of this optical power monitor 285 will be proportional to the optical power inputted into the optical amplifier 210.

An optical splitter 284 distributes the inputted optical signal to the burst-mode receiver 220 and an optical power monitor 286. The ratio of distribution does not need to be 50% each, and may be 90% to the optical amplifier 210 and 10% to the optical power monitor 285. By setting in this way, the ratio of the optical power inputted into the burst-mode receiver 220 is raised, and degradation of the minimum receive sensitivity of the optical receiver section caused by introducing the optical splitter 283 is prevented.

The optical power monitor 286 detects the optical power of the inputted optical signal, and outputs a voltage signal proportional to the optical power to the gain detector section 287. Since the distribution ratio in the optical splitter 284 is constant, the output of this optical power monitor 286 will be proportional to an optical power outputted from the optical amplifier 210.

Based on the inputs from the optical power monitors 285, 286, the gain detector section 287 calculates an actual gain in the optical amplifier, and outputs a magnitude of the gain to the optical amplifier control section 244 as gain information. The gain in the optical amplifier is obtained by calculating a ratio of voltage values of the optical power monitor 286 and the optical power monitor 285.

Based on the optical amplifier gain acquired from the gain setting section 270, the gain information acquired from the gain detector section 287, and the optical amplifier characteristic information acquired from the optical amplifier characteristic management section 250, the optical amplifier control section 244 decides the injection current, and outputs the injection current information I representing the amount of injection current to the driver circuit 230. Moreover, based on the reset signal acquired from the MPCP control section 52, it sets the injection current information to the default current value I_default. A method for deciding the injection current in the optical amplifier control section 244 will be described later.

[Operations of Optical Amplifier Control Section in the Fourth Embodiment]

Figure 20:
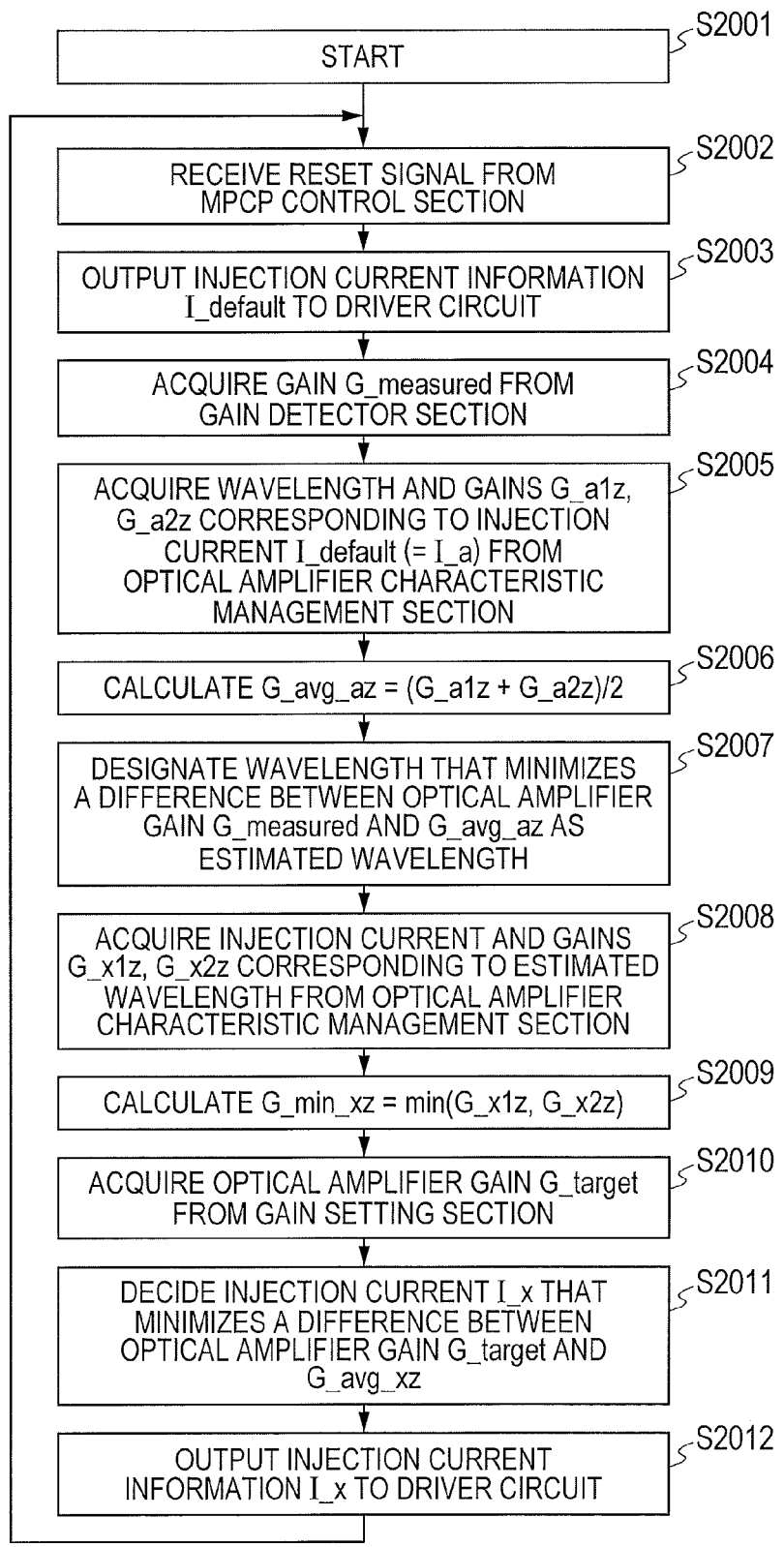
FIG. 20 is a flowchart showing operations of the optical amplifier control section in the fourth embodiment of the present invention.

Operations of the optical amplifier control section 244 in the fourth embodiment will be explained in detail. Note that while in the third embodiment, the optimum amount of injection current was decided based on the wavelength acquired from the wavelength detection section, in the fourth embodiment, the optimum injection current is decided based on the gain information acquired from the gain detector section. FIG. 20 shows a flowchart showing operations of the optical amplifier control section in the fourth embodiment. At S2001, the operation of the optical amplifier control section is started, and the process moves to S2002. At S2002, the optical amplifier control section receives the reset signal from the MPCP control section 52, and the process moves to S2003. At S2003, the optical amplifier control section outputs the injection current information I_default to the driver circuit in order to set the current to the default injection current, and the process moves to S2004. At S2004, the optical amplifier control section acquires the gain information G_measured from the gain detector section, and the process moves to S2005. At S2005, the optical amplifier control section acquires a correspondence between the wavelength $\Lambda\_z$ applicable to the injection current I_default (=I_a) and gains $G\_a1z$, $G\_a2z$ (z=1 to n). Upon completion of the acquisition of the correspondence between the wavelength and the gains, the process moves to S2006. At S2006, the optical amplifier control section calculates an average gain $G\_avg\_az=(G\_a1z+G\_a2z)/2$ (z=1 to n) for each wavelength $\Lambda\_z$. Upon completion of the calculation, the process moves to S2007. At S2007, the optical amplifier control section compares the gain G_measured that was acquired from the gain detector section and $G\_avg\_az$ (z=1 to n), decides the wavelength $\Lambda\_z$ that minimizes the difference, and designates this wavelength as an estimated wavelength, and the process moves to S2008. At S2008, the optical amplifier control section acquires a correspondence between the injection current I_x related to the estimated wavelength and the gains $G\_x1z$, $G\_x2z$. For example, when the wavelength is $\Lambda\_3$, the optical amplifier control section acquires a correspondence between I_x and $G\_x13$, $G\_x13$ (x=1 to m). Upon completion of the acquisition of the correspondence between the injection current and the gains, the process moves to S2009. At S2009, the optical amplifier control section calculates a correspondence between the injection current I_x and the gain $G\_min\_xz=\min(G\_x1z, G\_x2z)$ from the acquired I_x and $G\_x1z$, $G\_x2z$. Incidentally, the function min (A, B) returns a smaller value of A and B. Upon completion of the calculation, the process moves to S2010. At S2010, the optical amplifier control section acquires G_target that is the optical amplifier gain being intended to be set from the gain setting section 270, and the process moves to S2011. At S2011, the optical amplifier control section decides the injection current I_x that minimizes the difference between the optical amplifier gain G_target being intended to be set and $G\_min\_xz$ (x=1 to m). Upon completion of the decision of the injection current, the process moves to S2012. At S2012, the optical amplifier control section outputs the decided injection current information to the driver circuit. Upon completion of the output, the process returns to S2002. By repeating the steps of S2002 to S2012, it is possible to control the injection current based on the transmission wavelength of each ONU when receiving the optical signal from the each ONU.

[Example of Operation Sequence at the Time of Normal Transmission in the Fourth Embodiment]

Operations at the time of uplink transmission between the ONU and the OLT in the fourth embodiment of the present invention will be explained. Here, the explanation will be given dividing the operations into those at the time of the normal transmission and those at the time of the Discovery operation.

Figure 21:
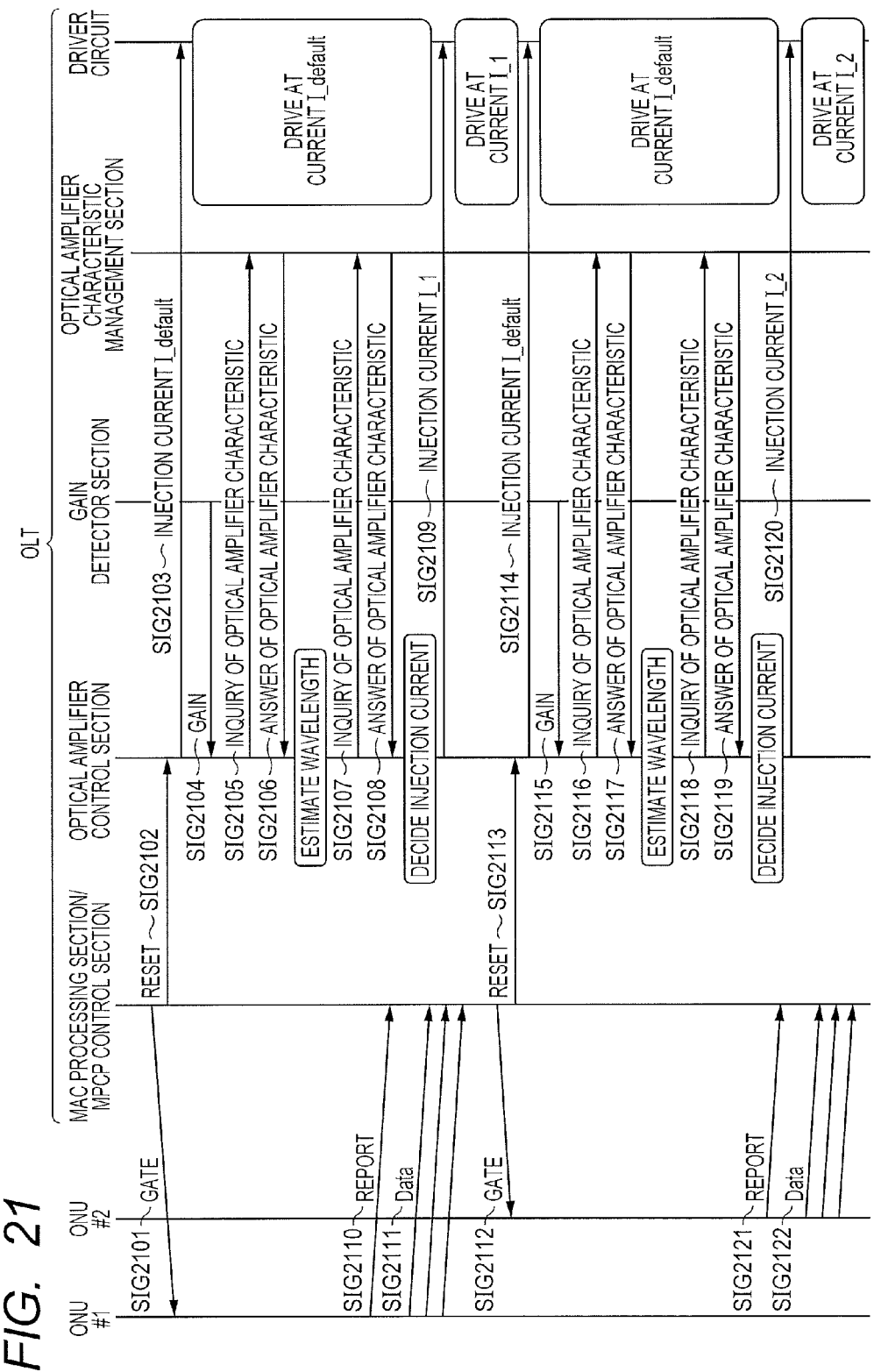
FIG. 21 is an example of a sequence at the time of the normal transmission in the fourth embodiment of the present invention.

FIG. 21 shows an operation sequence at the time of the normal transmission in the fourth embodiment of the present invention. In this sequence, only components necessary to explain operations in the normal transmission among the components of the OLT are depicted. Moreover, in order to simplify the explanation, the explanation will be given assuming that only two ONU's, ONU1 and ONU2, are connected.

First, the MPCP control section 52 transmits to ONU1 a GATE message that gives ONU1 permission of uplink transmission (SIG2101). After that, the MPCP control section 52 outputs the reset signal to the optical amplifier control section 244 (SIG2102). Upon reception of the reset signal, the optical amplifier control section 244 outputs the default injection current information I_default to the driver circuit 230 (SIG2103). The driver circuit 230 injects the current I_default into the optical amplifier based on the inputted injection current information. As a result, the optical amplifier operates on the default condition. After that, the optical amplifier control section 244 acquires the gain information from the gain detector section 287 (SIG2104). Next, the optical amplifier control section 244 acquires the optical amplifier characteristic at the injection current I_default (SIG2105, SIG2106). The optical amplifier control section 244 decides an estimated wavelength from the acquired optical amplifier characteristic and a detected gain. Furthermore, the optical amplifier control section 244 inquires of the optical amplifier characteristic management section 250 as to the optical amplifier characteristic corresponding to the estimated ONU transmission wavelength (SIG2107). The optical amplifier characteristic management section 250 notifies the optical amplifier gain at an injection current applicable to the wavelength on each polarization condition to the optical amplifier control section (SIG2108). The optical amplifier control section 244 decides the injection current information I1 based on the acquired optical amplifier characteristic and a gain that is intended to be set, and outputs the decided injection current information I1 to the driver circuit (SIG2109). The driver circuit 230 injects a current into the optical amplifier based on the inputted injection current information. The current I1 is injected into the optical amplifier, which amplifies the optical signal by the amplification factor close to a gain being set at the time of the optical reception from ONU1. After that, the signal comprised of the REPORT signal and data from ONU1 is sent to the MAC processing section or the MPCP control section 52 via the optical amplifier, the burst-mode receiver, and the PHY processing section (SIG2110, SIG2111). Here, regarding operations in a period of SIG2102 to SIG2111, supplementary information will be given. In this sequence, although the wavelength detection section seems to acquire the wavelength before the OLT receives the optical signal comprised of REPORT and Data from ONU1, actually preamble reception of the burst signal is started before detecting the gain at SIG2104, the gain detected in a period in which the preamble part of the burst signal is received, and the adjustment of the injection current is completed. After that, the MPCP control section receives REPORT after receiving a payload portion. A point of argument returns to the explanation of the sequence again. Upon completion of the reception from ONU1, the process moves to the receiving operations from ONU2.

Since the receiving operations from ONU2 (from SIG2112 to SIG2122) are almost the same as the receiving operations from ONU1, their explanations are omitted. At the time of ONU2 reception, the current I2 is injected into the optical amplifier, which amplifies the optical signal by the amplification factor close to a gain being set at the time of the optical reception from ONU2.

Since the above operations adjust the injection current according to the wavelength for every ONU, it is possible to receive the optical signal with an almost constant gain even when the optical amplifier gain has the wavelength dependency.

A timing at which the MPCP control section 52 outputs the reset signal to the optical amplifier control section 244 is the same as in the third embodiment.

[Example of Operation Sequence at the Time of Discovery in the Fourth Embodiment]

Next, operations at the time of Discovery in the fourth embodiment will be explained. In the fourth embodiment, in order to detect a gain from the received optical signal and to adjust the injection current, the operation is the same between at the time of the normal transmission and at the time of Discovery. Therefore, an explanation using a sequence diagram is omitted.

[Control of Burst-Mode Receiver in the Fourth Embodiment]

In the fourth embodiment, the reset signal may be inputted into each of the optical amplifier control section and the burst-mode receiver, similarly with the third embodiment.

Effect in the Fourth Embodiment

Also in the fourth embodiment, by adjusting the amount of injection current for every wavelength of the received burst signal, it is possible to keep the overall gain that is the sum of the gain of the optical amplifier and the amount of attenuation of the variable attenuator almost constant without depending on the wavelength even when the wavelength of the received burst signal varies for every ONU. Therefore, also in the fourth embodiment, it is possible to keep the receivable range of the optical receiver section in a wide state, similarly with the third embodiment.

While the third embodiment includes the optical spectrum detector, the fourth embodiment substitutes two optical power monitors for it. Since the optical power monitor can be realized with a simpler configuration compared with the optical spectrum detector, it is possible to make the configuration of the optical receiver section simpler.

Fifth Embodiment

Next, a fifth embodiment of the present invention will be described. The explanation will be given focusing on a difference with respect to the third embodiment. In the fifth embodiment, let it be assumed that the wavelength is assigned for every transmission rate of the ONU. For example, consider a case where the transmission wavelength of the ONU whose transmission rate is 10.3125 Gbps is 1270 nm and the transmission wavelength of the ONU whose transmission rate is 1.25 Gbps is 1310 nm. The explanation will be given focusing on a difference with respect to the third embodiment. In the fifth embodiment, instead of directly detecting the wavelength, the wavelength is estimated from the uplink transmission rate of the ONU, and the injection current of the optical amplifier is adjusted based on the estimated wavelength.

[Configuration of Optical Receiver Section in the Fifth Embodiment]

Figure 22:
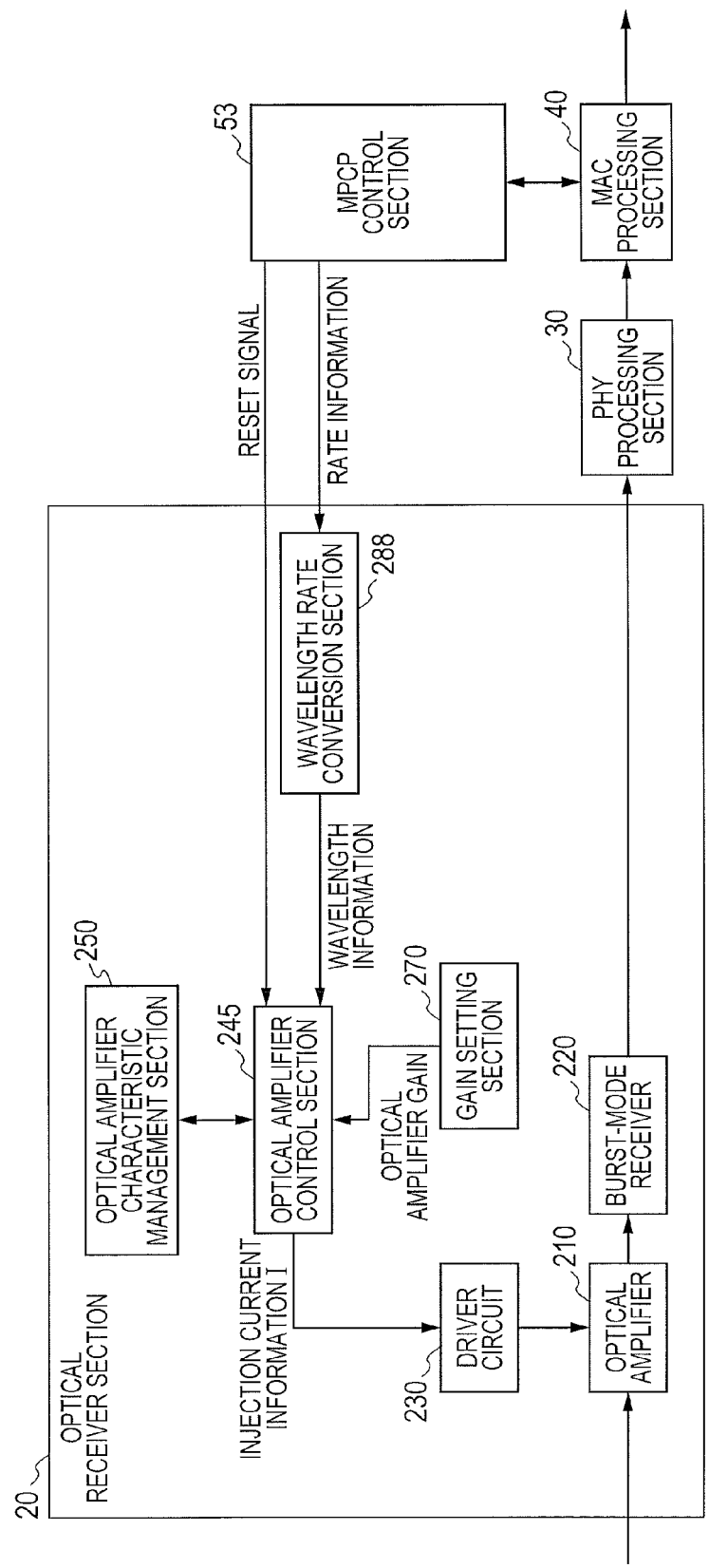
FIG. 22 is a configuration of an optical receiver section in a fifth embodiment of the present invention.

FIG. 22 shows a configuration of an optical receiver section 20 in the fifth embodiment of the present invention. Differences with respect to the third embodiment are a point of having none of the optical splitter, the optical spectrum detector, and the wavelength detection section and a point of having a wavelength rate conversion section 288 instead. Moreover, this configuration includes an MPCP control section 53 that is different in function from that of the third embodiment.

Since operations of the optical amplifier 210, the driver circuit 230, the burst-mode receiver 220, the PHY processing section 30, the MAC processing section 40, the optical amplifier characteristic management section 250, and the gain setting section 270 are the same as those in the first embodiment, their explanations are omitted. Incidentally, since an optical amplifier control section 245 has the same function as the optical amplifier control section of the third embodiment does, its explanation is omitted similarly.

The wavelength rate conversion section 288 estimates the wavelength based on rate information inputted from the MPCP control section 53, and outputs the estimated wavelength information to the optical amplifier control section 245. For example, when the rate information inputted from the MPCP control section 53 is 10.3125 Gbps, 1270 nm is outputted as the wavelength information; when the inputted rate information is 1.25 Gbps, 1310 nm is outputted as the wavelength information.

The MPCP control section 53 outputs the reset signal to the optical amplifier control section 243 being timed to the receiving timing of the burst optical signal. Regarding the receiving timing of the burst optical signal, the receiving timing can be calculated based on, for example, the time information of the GATE message for specifying the transmission time to the ONU. Moreover, it outputs the transmission rate of the ONU that is received simultaneously. Here, the MPCP control section 53 shall have registered the transmission rate of each ONU at the time of the ONU registration.

[Example of Operation Sequences at the Time of Normal Transmission and at the Time of Discovery in the Fifth Embodiment]

The operations at the time of uplink transmission between the ONU and the OLT in the fifth embodiment of the present invention are almost the same as in the third embodiment. While in the third embodiment, the optical amplifier control section acquires the wavelength information from the wavelength detection section; in the fifth embodiment, what are different are a point that the MPCP control section outputs the rate information to the wavelength rate conversion section being timed to the reset signal and a point that the optical amplifier control section acquires the wavelength information from the wavelength rate conversion section.

Effect in the Fifth Embodiment

Also in the fifth embodiment, by adjusting the amount of injection current for every wavelength of the received burst signal, it is possible to keep the gain of the optical amplifier almost constant without depending on the wavelength even when the wavelength of the received burst signal varies for every ONU. Therefore, also in the fifth embodiment, it is possible to keep the receivable range of the optical receiver section in a wide state, similarly with the third embodiment.

Although the third embodiment includes the optical spectrum detector, the fifth embodiment includes the wavelength rate conversion section. Since the wavelength rate conversion section only converts the received rate information into the wavelength information and outputs it, it is possible to simplify a configuration of the optical receiver section more. Moreover, since there is no optical splitter for an input or output of the optical amplifier, there is no insertion loss caused by passing the optical splitter, and it is possible to prevent degradation of the minimum receive sensitivity of the optical receiver section.

Sixth Embodiment

A sixth embodiment of the present invention will be described. The explanation will be given focusing on a difference with respect to the fifth embodiment. In the sixth embodiment, let it be assumed that the wavelength is assigned for every transmission rate of the ONU, similarly with the fifth embodiment. For example, consider a system such that the transmission wavelength of the ONU whose transmission rate is 10.3125 Gbps is 1270 nm, and the transmission wavelength of the ONU whose transmission rate is 1.25 Gbps is 1310 nm. The explanation will be given focusing on a difference with respect to the fifth embodiment. While in the fifth embodiment, the wavelength was estimated based on the rate information acquired from the MPCP control section; in the sixth embodiment, the receive rate is detected from the received optical signal, and the wavelength is estimated based on the receive rate.

[Configuration of Optical Receiver Section in the Sixth Embodiment]

Figure 23:
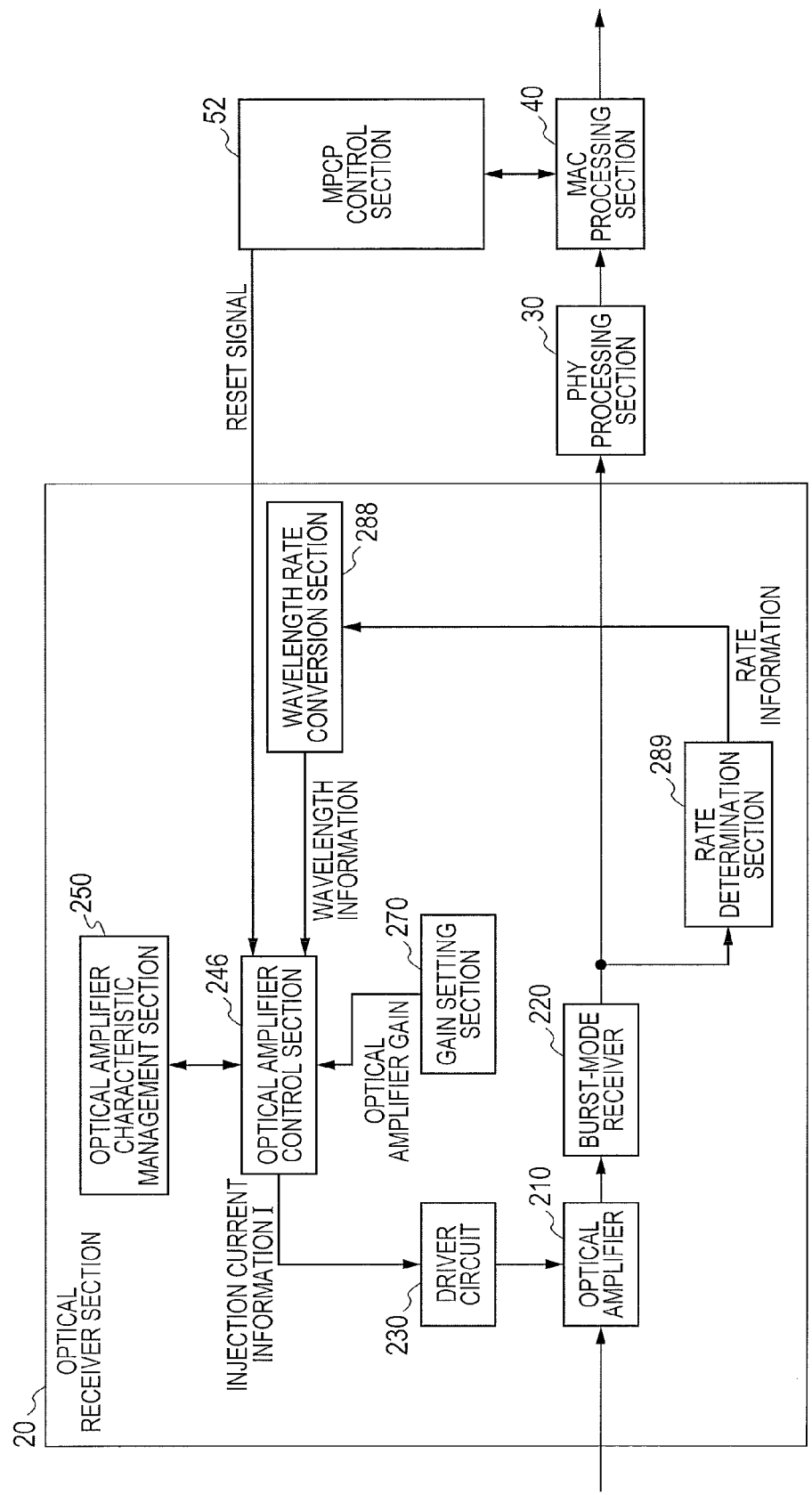
FIG. 23 is a configuration of an optical receiver section in a sixth embodiment of the present invention.

FIG. 23 shows a configuration of an optical receiver section 20 in the sixth embodiment of the present invention. The difference with respect to the fifth embodiment is a point of having a rate determination section 289. Moreover, this configuration includes the same MPCP control section 52 as in the third embodiment.

The rate determination section 289 detects the rate of the electric output signal of the burst-mode receiver 220, and outputs the detected rate information to the wavelength rate conversion section 288. What is necessary to determine the rate is just to, for example, detect a frequency spectrum of the inputted electrical signal and estimate the rate from the detected frequency spectrum. This uses a fact that a distribution of frequency spectrum is different depending on the rate of the signal, which enables the signal to be identified in terms of the magnitude of signal strength in a certain frequency band. This rate determination shall be determined when the preamble part is received.

[Example of Operation Sequences at the Time of Normal Transmission and at the Time of Discovery in the Sixth Embodiment]

Operations at the time of uplink transmission between the ONU and the OLT in the sixth embodiment of the present invention are almost the same as in the fifth embodiment. A difference is a method for acquiring the rate information in the wavelength rate conversion section. While in the fifth embodiment, the rate information was acquired from the MPCP control section; in the sixth embodiment, it is acquired from the rate determination section.

Effect in the Sixth Embodiment

Also in the sixth embodiment, by adjusting the amount of injection current for every wavelength of the received burst signal, it is possible to keep the gain of the optical amplifier almost constant without depending on the wavelength even when the wavelength of the received burst signal varies for every ONU. Therefore, also in the sixth embodiment, it is possible to keep the receivable range of the optical receiver section in a wide state.

The sixth embodiment has an effect that an interface of the MPCP control section and the optical receiver section becomes simple in addition to the same effect as that of the fifth embodiment. Specifically, while in the fifth embodiment, a control interface of the reset signal and the rate information was required between the MPCP control section and the optical receiver section; in the sixth embodiment, the control interface needs to support only the reset signal.

Seventh Embodiment

A seventh embodiment of the present invention will be described. The explanation will be given focusing on a difference with respect to the first and fourth embodiments. In the fourth embodiment, by monitoring the input and output optical powers of the optical amplifier, the gain was estimated and the injection current was decided based on the estimated gain. In the seventh embodiment, the gain is estimated based on an RSSI (Received Signal Strength Indicator) output of the burst-mode receiver and RTT (Round Trip Time) between the OLT and the ONU, and the injection current is adjusted based on the estimated gain.

[Configuration of Optical Receiver Section in the Seventh Embodiment]

Figure 24:
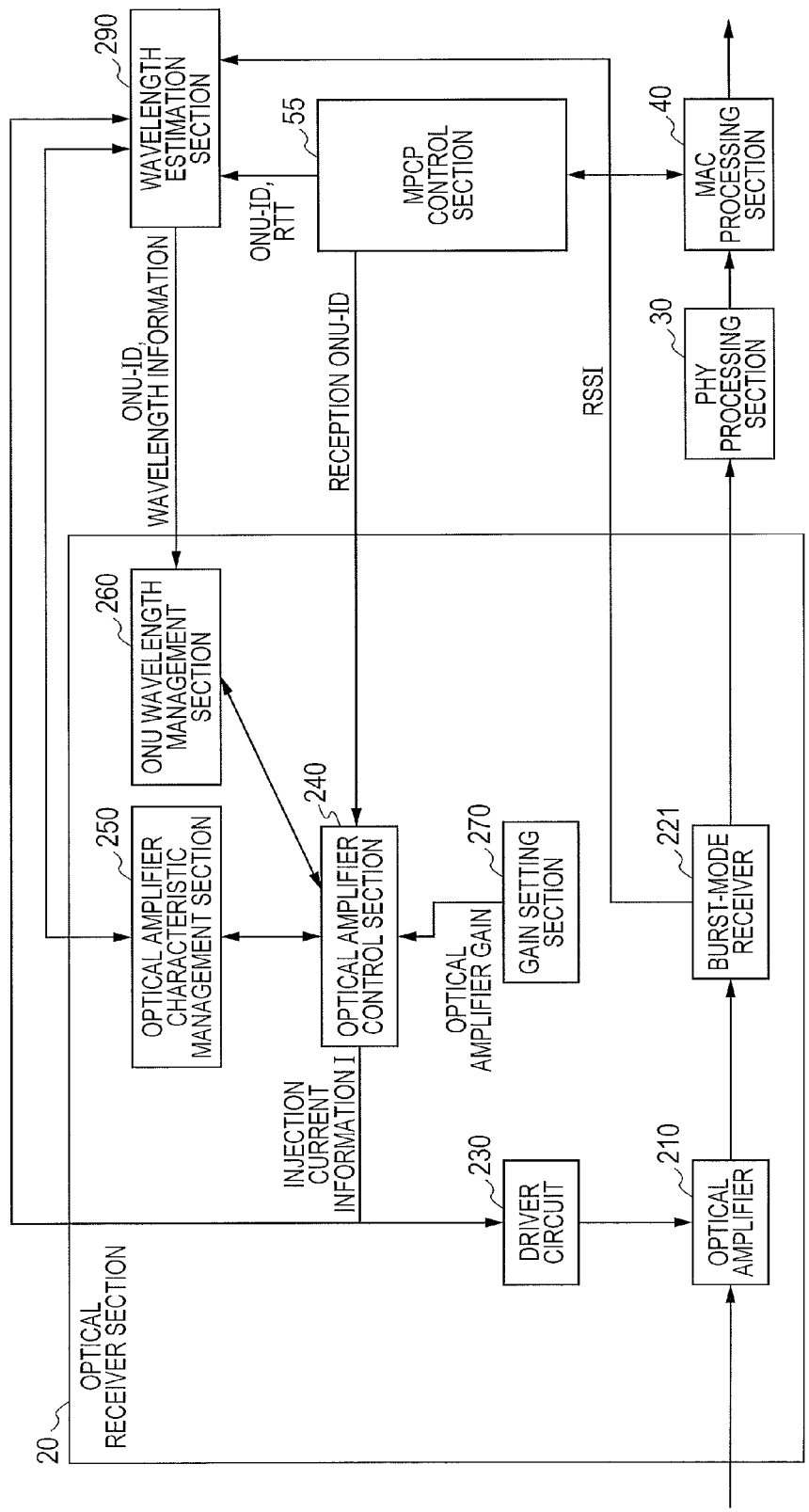
FIG. 24 is a configuration of an optical receiver section in a seventh embodiment of the present invention.

FIG. 24 shows a configuration of an optical receiver section 20 in the seventh embodiment of the present invention. The seventh embodiment includes the wavelength estimation section 290.

A burst-mode receiver 221 has a function of outputting an RSSI signal representing the strength of the received signal in addition to a function of converting the optical input from the optical amplifier into the electrical signal.

An MPCP control section 55 outputs the ONU-ID and the RTT to a wavelength estimation section 290 in addition to outputting the reception ONU-ID to the optical amplifier control section 240.

Based on the RSSI inputted from the burst-mode receiver 221, the ONU-ID and the RTT inputted from the MPCP control section 55, and the optical amplifier characteristic acquired from the optical amplifier characteristic management section 250, the wavelength estimation section 290 registers the ONU-ID and the wavelength information in the ONU wavelength management section 260. Details of operations of the wavelength estimation section 290 will be described later.

[Operations of Wavelength Estimation Section in the Seventh Embodiment]

Figure 25:
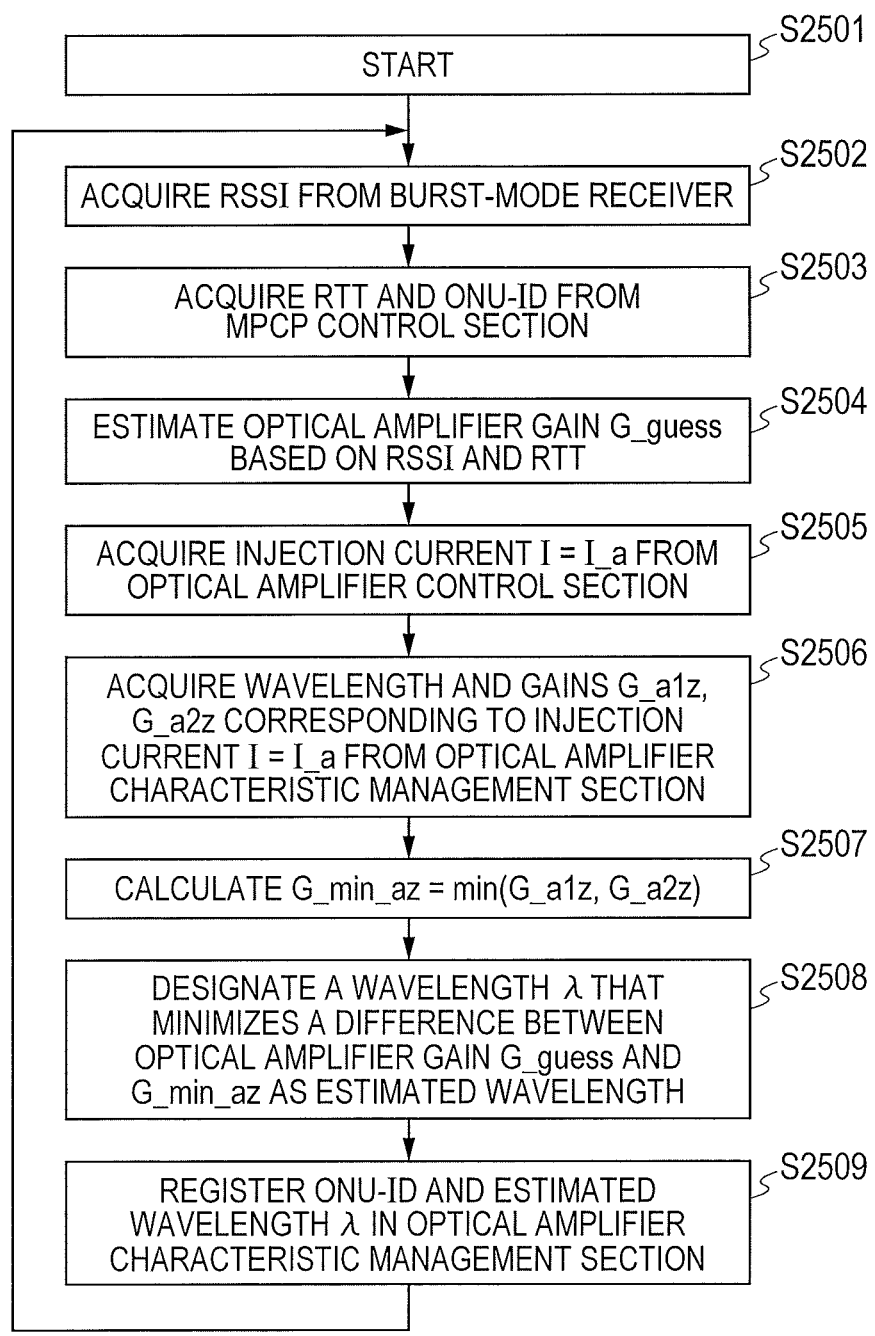
FIG. 25 is a flowchart showing operations of a wavelength estimation section in the seventh embodiment of the present invention.

Operations of the wavelength estimation section 290 in the seventh embodiment will be explained in detail. FIG. 25 shows a flowchart showing the operations of the wavelength estimation section 290 in the seventh embodiment. The operation of the wavelength estimation section is started at S2501, and the process moves to S2502. At S2502, the wavelength estimation section 290 acquires the RSSI from the burst-mode receiver. At S2503, the wavelength estimation section 290 acquires the RTT and the ONU-ID from the MPCP control section 52, and the process moves to S2504. At S2504, the wavelength estimation section 290 estimates the optical amplifier gain G_guess based on the acquired RSSI and RTT, and the process moves to S2505. Here, a method for estimating the gain of the optical amplifier will be explained in detail. Since the RSSI is roughly proportional to the strength of the optical signal that is inputted into the burst-mode receiver, the output power of the optical amplifier can be calculated from the acquired RSSI. Moreover, a distance between the ONU and the OLT can be calculated from the RTT, and an amount of optical attenuation in a PON section can be calculated from the number of branches of PON that is known and the distance between the ONU and the OLT. Since a range of the transmission power of the ONU in PON is prescribed by a standard, an approximate ONU transmission power can be calculated. Therefore, the optical power inputted into the OLT can be estimated by the ONU transmission power and the amount of optical attenuation in the PON section, and therefore the optical power inputted into the optical amplifier can be estimated. Therefore, since an output power of the optical amplifier and an input power of the optical amplifier can be estimated, it is possible to estimate the optical amplifier gain. Here, a point of an argument returns to the explanation of the flowchart. At S2505, the wavelength estimation section 290 acquires the injection current information I currently being set from the optical amplifier control section, and the process moves to S2506. At S2506, the wavelength estimation section 290 acquires the correspondence between the wavelength $\Lambda\_z$ applicable to the injection current I ($=I\_a$) and the gains G_a1z, G_a2z (z=1 to n) from the optical amplifier characteristic management section. Upon completion of the acquisition of the correspondence between the wavelength and the gains, the process moves to S2507. At S2507, the wavelength estimation section 290 calculates a minimum gain G_min_az=min (G_a1z, G_a2z) (z=1 to n) about each wavelength $\Lambda\_z$. Upon completion of the calculation, the process moves to S2508. At S2508, the wavelength estimation section 290 compares the estimated gain G_guess and G_min_az (z=1 to n), decides the wavelength $\Lambda\_z$ that minimizes the difference, and designates this wavelength as an estimated wavelength, and the process moves to S2509. At S2509, the wavelength estimation section 290 registers the correspondence between the ONU-ID and the estimated wavelength in the optical amplifier characteristic management section. Upon completion of the registration, the process returns to S2502. By repeating the steps of S2502 to S2509, it is possible to estimate the wavelength corresponding to each ONU-ID, and to update a table for retaining the optical amplifier characteristic that the optical amplifier characteristic management section manages.

[Example of Operation Sequence at the Time of Normal Transmission in the Seventh Embodiment]

An operation sequence at the time of the normal transmission in the seventh embodiment is the same as the operation sequence at the time of the normal transmission in the first embodiment. Therefore, its explanation is omitted.

[Example of Operation Sequence at the Time of Discovery in the Seventh Embodiment]

Figure 26:
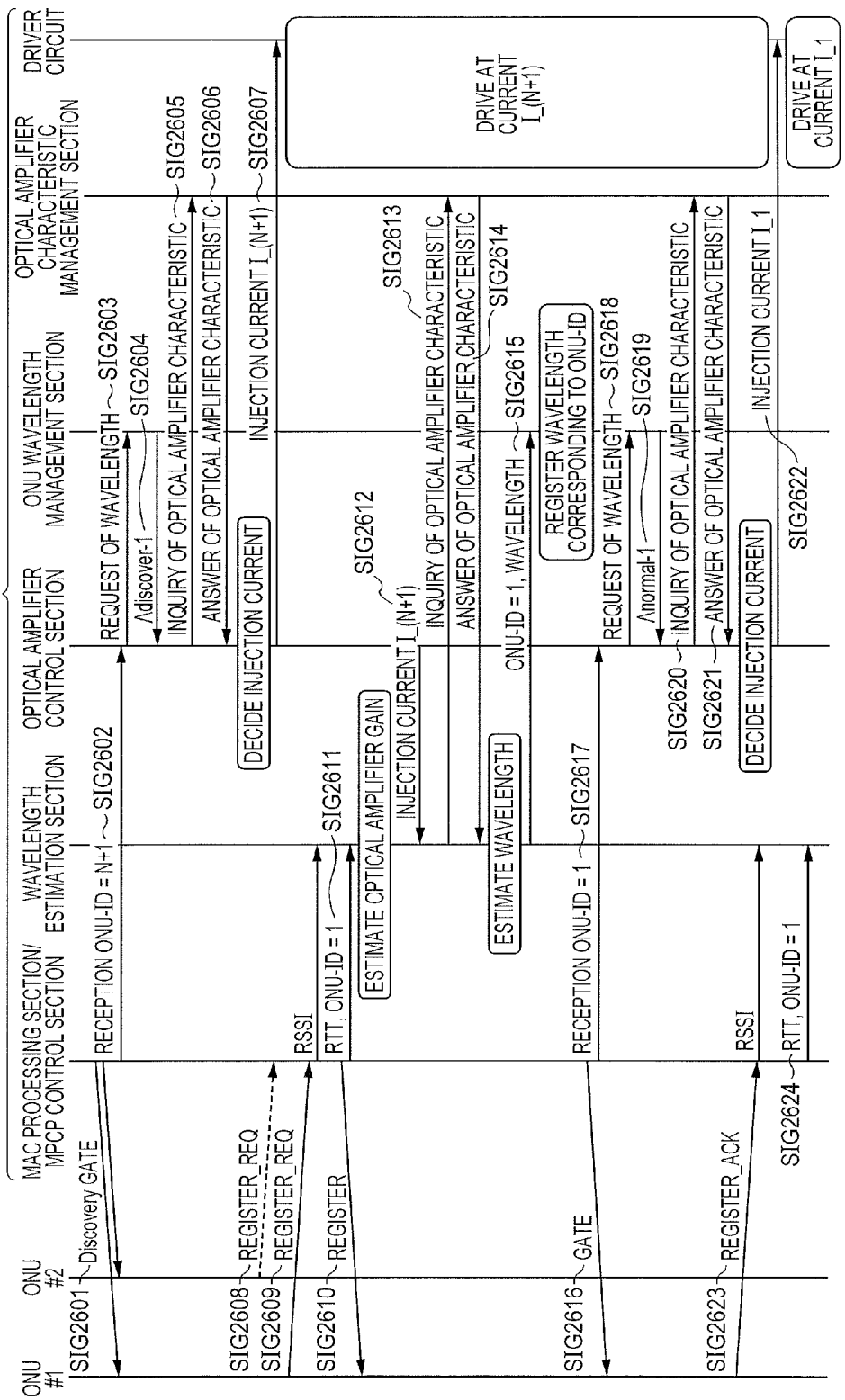
FIG. 26 is an example of a sequence at the time of Discovery in the seventh embodiment of the present invention.

Next, in the seventh embodiment, since the ONU that receives at the time of Discovery is not known in advance, an operation different from that at the time of the normal transfer becomes necessary. FIG. 26 shows an operation sequence at the time of Discovery in the seventh embodiment of the present invention. In this sequence, only components necessary to explain operations at the time of Discovery among the components of the OLT are depicted. Moreover, in order to simplify the explanation, the explanation is given assuming that only two ONU's, ONU1 and ONU2, are connected. Incidentally, let it be assumed that neither ONU1 nor ONU2 has been registered at the start time of this sequence.

First, the OLT sends out DiscoveryGATE from the MPCP control section to all the ONU's by broadcasting (SIG2601). Next, the MPCP control section notifies the optical amplifier control section of the reception ONU-ID=N+1 (SIG2602). Note that N+1 is not ONU-ID corresponding to existing ONU but ONU-ID used for Discovery. The optical amplifier control section inquires of the ONU wavelength management section 260 as to the ONU transmission wavelength corresponding to the notified ONU-ID=N+1 (SIG2603). The ONU wavelength management section that received the inquiry notifies the wavelength $\Lambda$discover-1 corresponding to ONU-ID=N+1 to the optical amplifier control section (SIG2604).

The optical amplifier control section inquires of the optical amplifier characteristic management section as to the optical amplifier characteristic corresponding to the acquired ONU transmission wavelength $\Lambda$discover-1 (SIG2605). The optical amplifier characteristic management section notifies an optical amplifier gain at an injection current applicable to the wavelength $\Lambda$discover-1 on each polarization condition to the optical amplifier control section (SIG2606). The optical amplifier control section decides the injection current information I_(N+1) based on the acquired optical amplifier characteristic and a gain that is intended to be set, and outputs the decided injection current information I_(N+1) to the driver circuit (SIG2607).

The driver circuit injects a current into the optical amplifier based on the inputted injection current information. The current I_(N+1) is injected into the optical amplifier, which amplifies the optical signal with the injection current that becomes optimum when the transmission wavelength is λdiscover-1. Therefore, when the transmission wavelength of the ONU is close to λdiscover-1, the amplification gain of the optical sign actually becomes close to the gain that has been set up, and therefore receiving it is possible. In this embodiment, let it be assumed that although the transmission wavelength of ONU1 is close to λdiscover-1, the transmission wavelength of ONU2 is different from λdiscover-1 greatly.

When unregistered ONU1 and ONU2 receive Discovery-GATE, each of them transmits REGISTER_REQ after they wait only for respective random times (SIG2608, SIG2609). These optical signals are sent to the MAC processing section or the MPCP control section via the optical amplifier, the burst-mode receiver, and the PHY processing section. Although REGISTER_REQ is received from both ONU1 and ONU2, valid reception is possible only from ONU1 that is an ONU whose transmission wavelength is close to λdiscover-1. Therefore, the MPCP control section receives only REGISTER_REQ from ONU1

The MPCP control section transmits REGISTER to ONU1 from which REGISTER_REQ was received (SIG2610). After receiving REGISTER_REQ, the MPCP control section calculates RTT corresponding to ONU1, and notifies the calculated RTT and ONU-ID=1 to the wavelength estimation section (SIG2611). Upon reception of RTT and ONU-ID, the wavelength estimation section estimates the gain of the optical amplifier. After that, the wavelength estimation section acquires the injection current information I_(N+1) from the optical amplifier control section (SIG2612). The wavelength estimation section that acquired the injection current information acquires the optical amplifier characteristic corresponding to an injection current I_(N+1) (SIG2613, SIG2614). The wavelength estimation section estimates a wavelength from the acquired optical amplifier characteristic and the estimated gain of the optical amplifier. Furthermore, the wavelength estimation section notifies the ONU wavelength management section of a correspondence between the ONU-ID and the estimated wavelength (SIG2615). The ONU wavelength management section registers the notified ONU-ID and the corresponding wavelength.

Next, the MPCP control section examines the ONU-ID of ONU1 that is an ONU to which GATE is destined to be transmitted. Incidentally, if the MAC Address of the ONU is used as the ONU-ID, the destination MAC address of GATE will serve as the ONU-ID as it is. Here, let it be assumed that the ONU-ID of ONU1 is unity. The MPCP control section notifies the optical amplifier control section of ONU-ID=1 that is an identifier of ONU1 (SIG2617). The optical amplifier control section inquires of the ONU wavelength management section as to the ONU transmission wavelength corresponding to the notified ONU-ID=1 (SIG2618). The ONU wavelength management section that received the inquiry notifies the wavelength λnormal-1 corresponding to ONU-ID=1 to the optical amplifier control section (SIG2619).

The optical amplifier control section inquires of the optical amplifier characteristic management section as to the optical amplifier characteristic corresponding to the ONU transmission wavelength λnormal-1 acquired (SIG2620). The optical amplifier characteristic management section notifies the optical amplifier gain at an injection current applicable to the wavelength λnormal-1 on each polarization condition to the optical amplifier control section (SIG2621). The optical amplifier control section decides the injection current information I1 based on the optical amplifier characteristic acquired and a gain that is intended to be set, and outputs the decided injection current information I1 to the driver circuit (SIG2622).

The driver circuit injects a current into the optical amplifier based on the inputted injection current information. The current I1 is injected into the optical amplifier, which amplifies the optical signal by the amplification factor close to a gain being set at the time of the optical reception from ONU1. After that, ONU1 transmits REGISTER_ACK in a period assigned by GATE (SIG2616) (SIG2623). Since when receiving this REGISTER_ACK, a current is set to the injection current I1 optimum for the wavelength coming from ONU1, normal reception is possible.

The above is the operations of one cycle of Discovery. In the first embodiment of the present invention, the above is repeated for M times in which the ONU-ID changes like N+1, N+2, . . . , N+M. This procedure means setting the optical amplifier operated at an optimum injection current for M kinds of transmission wavelengths because the ONU transmission wavelength is not known in advance at the time of Discovery. Thereby, it becomes possible to register any ONU of whatever transmission wavelength. Incidentally, an order of Discovery and the normal transmission is that M times of Discovery and the normal transmissions are alternately repeated, for example. Alternatively, repetition may be as follows: Discovery#1, normal transmission, Discovery#2, normal transmission, . . . , Discovery#M, and normal transmission.

Effect in the Seventh Embodiment

Also in the seventh embodiment, by adjusting the amount of injection current for every wavelength of the received burst signal, it is possible to keep the gain of the optical amplifier almost constant without depending on the wavelength even when the wavelength of the received burst signal varies for every ONU.

In the seventh embodiment, it is not necessary to add parts newly for wavelength estimation, and the optical receiver section can be realized only with existing parts; therefore, it becomes possible to reduce the number of parts thereof. Moreover, since the optical splitter for performing the wavelength estimation becomes unnecessary, it is possible to prevent an increase in the insertion loss and to prevent degradation of the receive sensitivity.

Eighth Embodiment

An eighth embodiment of the present invention will be described. In the first to seventh embodiments, the modes each of which is capable of keeping the gain of the optical amplifier almost constant without depending on the wavelength by adjusting the injection current for every ONU transmission wavelength were explained. In the eighth embodiment, the receivable range of the optical receiver section is widened by controlling the injection current to regulate the optical amplifier gain also based on the received optical power in addition to the ONU transmission wavelength. Here, the explanation will be given focusing on a difference with respect to the third embodiment.

[Configuration of Optical Receiver Section in the Eighth Embodiment]

Figure 27:
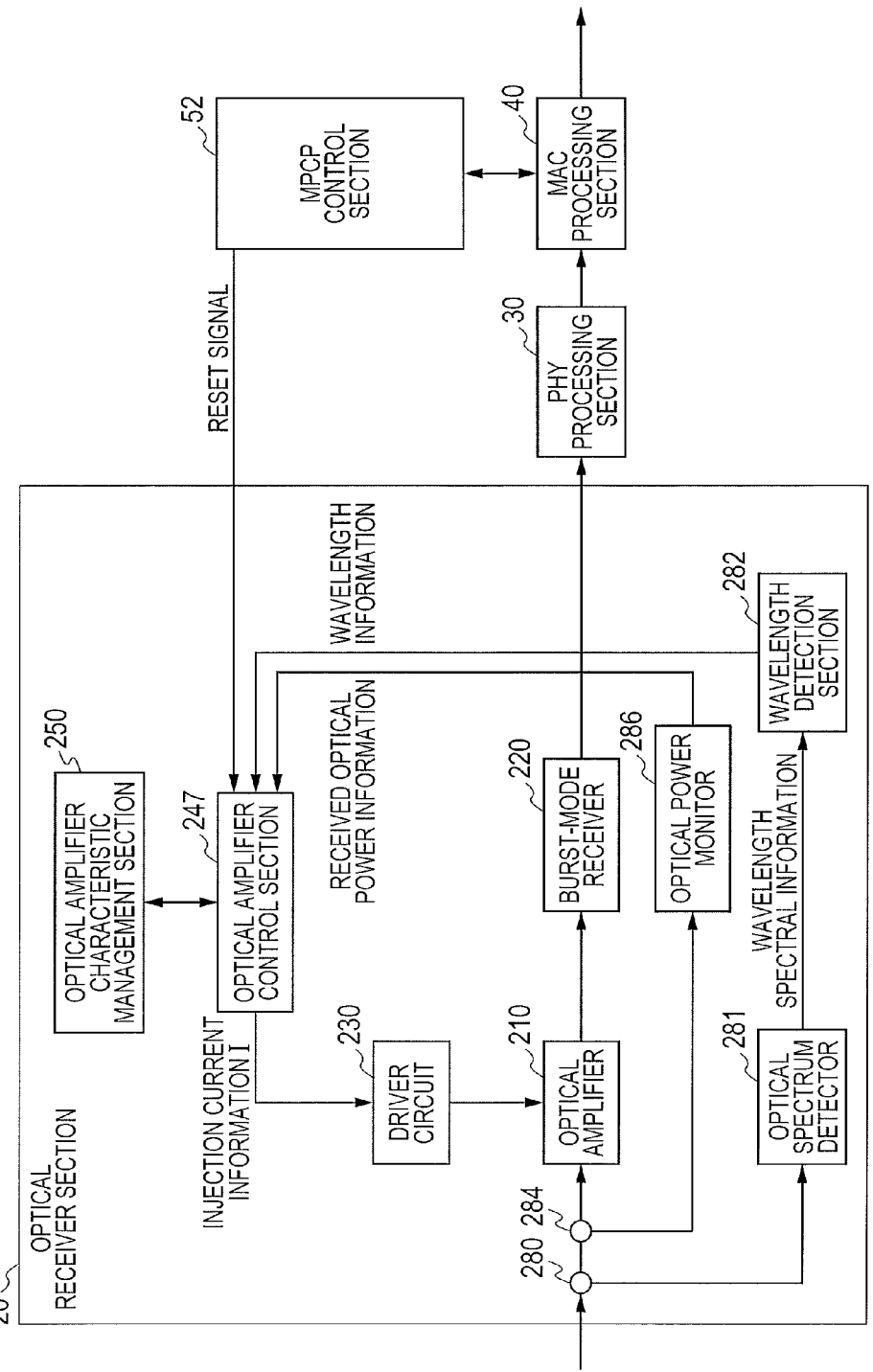
FIG. 27 is a configuration of an optical receiver section in an eighth embodiment of the present invention.

FIG. 27 shows a configuration of the optical receiver section 20 in the eighth embodiment of the present invention. In the eighth embodiment, the optical receiver section in the third embodiment includes the optical splitter 284 and the optical power monitor 286. Moreover, an optical amplifier control section 247 in the eighth embodiment controls the injection current based on the received optical power information in addition to the reset signal and the wavelength information.

The optical splitter 284 distributes the inputted optical signal to the optical amplifier 210 and the optical power monitor 286. The ratio of distribution does not need to be 50% each. For example, it may be 90% to the optical amplifier 210 and 10% to the optical spectrum detector 281. By setting in this way, the ratio of the optical power inputted into the optical amplifier 210 is raised, and degradation of the receive sensitivity of the optical receiver section caused by introducing the splitter 280 is prevented.

The optical power monitor 286 detects the optical power of the inputted optical signal, and outputs a voltage signal proportional to the optical power to the optical amplifier control section 247. The optical power monitor is comprised of a photodiode and a transimpedance amplifier, for example. Since the distribution ratios in the optical splitters 280, 284 are constant, the output of this optical power monitor 286 will be proportional to the optical power inputted into the optical amplifier 210. Based on the received optical power information acquired from the optical power monitor 286, the wavelength information acquired from the wavelength detection section 282, and the optical amplifier characteristic information acquired from the optical amplifier characteristic management section 250, the optical amplifier control section 247 decides the injection current, and outputs the injection current information I representing the amount of injection current to the driver circuit 230. Moreover, based on the reset signal acquired from the MPCP control section 52, the optical amplifier control section 247 sets the injection current information to the default current value I_default. A method for deciding the injection current of the optical amplifier control section 243 will be described later.

[Operations of Optical Amplifier Control Section in the Eighth Embodiment]

Figure 28:
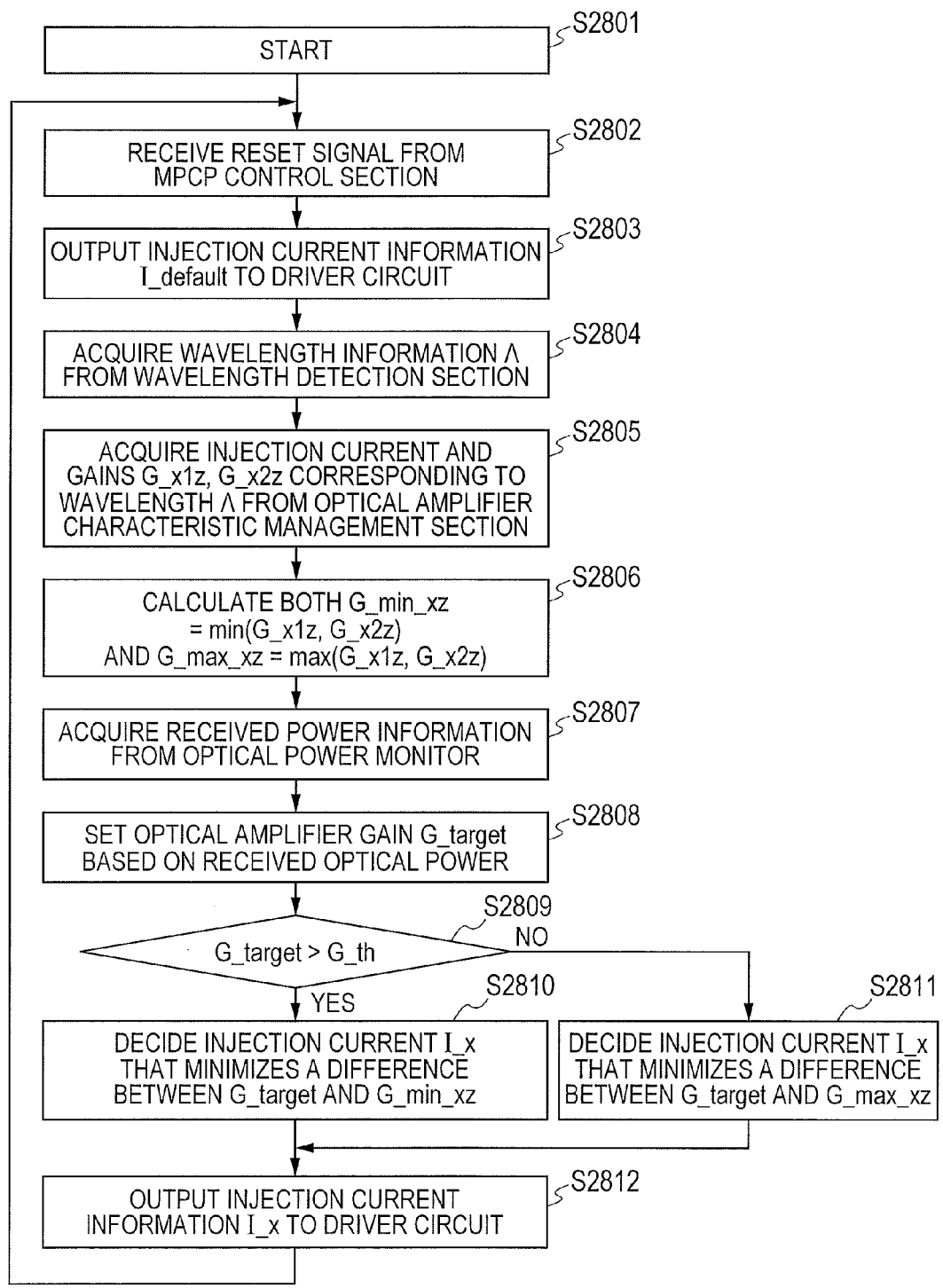
FIG. 28 is a flowchart showing operations of an optical amplifier control section in the eighth embodiment of the present invention.

Operations of the optical amplifier control section 247 in the eighth embodiment will be explained in detail. While in the third embodiment, the optimum amount of injection current is decided based on the wavelength acquired from the wavelength detection section; in the eighth embodiment, the optimum amount of injection current is decided based on the wavelength acquired from the wavelength detection section and the received optical power information acquired from the optical power monitor 286. FIG. 28 shows a flowchart showing operations of the optical amplifier control section in the eighth embodiment. At S2801, the operation of the optical amplifier control section is started, and the process moves to S2802. At S2802, the optical amplifier control section receives the reset signal from the MPCP control section, and the process moves to S2803. At S2803, in order to set the current to the default injection current, the optical amplifier control section outputs the injection current information I_default to the driver circuit, and the process moves to S2804. At S2804, the optical amplifier control section acquires the wavelength information Λ from the wavelength detection section, and the process moves to S2805.

At S2805, the optical amplifier control section acquires a correspondence of the injection current I_x related to the acquired wavelength and the gains G_x1z, G_2z. For example, when the wavelength is Λ_3, a correspondence of I_x and G_x13, G_x23 (x=1 to m) is acquired. Upon completion of the acquisition of the correspondence between the injection current and the gains, the process moves to S2806.

At S2806, correspondences between the injection current I_x and the gain G_min_xz=min(G_x1z, G_x2z), between the injection current I_x and the gain G_max_xz=max (G_x1z, G_x2z) are calculated from the acquired I_x, and G_x1z, G_x2z. Incidentally, the function min(A, B) returns a smaller value of A and B, and the function max(A, B) returns a larger value of A and B. Upon completion of the calculation, the process moves to S2807. At S2807, the received optical power information is acquired from the optical power monitor, and the process moves to S2808. At S2808, the optical amplifier gain G_target is decided based on the received optical power. For example, if the received optical power is smaller than a certain threshold, the optical amplifier will be set to have a largest possible gain; if the received optical power is equal to or larger than the certain threshold, the optical amplifier will be set so that the output power of the optical amplifier may be equal to or less than the maximum receive sensitivity of the burst-mode receiver. Upon completion of the setting of the gain G_target, the process moves to S2809. At S2809, the value of G_target and the threshold G_th are compared to perform the determination. Incidentally, the threshold G_th is set to, for example, a value being in a middle of the maximum and the minimum of G_target. When G_target>G_th holds, the process moves to S2810. In other cases than this, the process moves to S2811. At S2810, an injection current that minimizes a difference between the optical amplifier gain G_target that is intended to be set and G_min_xz (x=1 to m) is decided. Upon completion of the decision of the injection current, the process moves to S2812. At S2811, the injection current I_x that minimizes a difference between the optical amplifier gain G_target that is intended to be set and G_max_xz (x=1 to m) is decided. Upon completion of the decision of the injection current, the process moves to S2812. At S2812, the decided injection current information is outputted to the driver circuit. Upon completion of the output, the process returns to S2802. By repeating the steps of S2802 to S2812, it is possible to control the injection current based on the transmission wavelength and the received optical power of each ONU when receiving the optical signal from the each ONU.

[Example of Operation Sequence at the Time of Normal Transmission in the Eighth Embodiment]

Operations at the time of uplink transmission between the ONU and the OLT in the eighth embodiment of the present invention will be explained. Here, the explanations will be given dividing the operations into those at the time of the normal transmission and those at the time of the Discovery operation. Here, the explanation will be given focusing on a difference with respect to the third embodiment.

Figure 29:
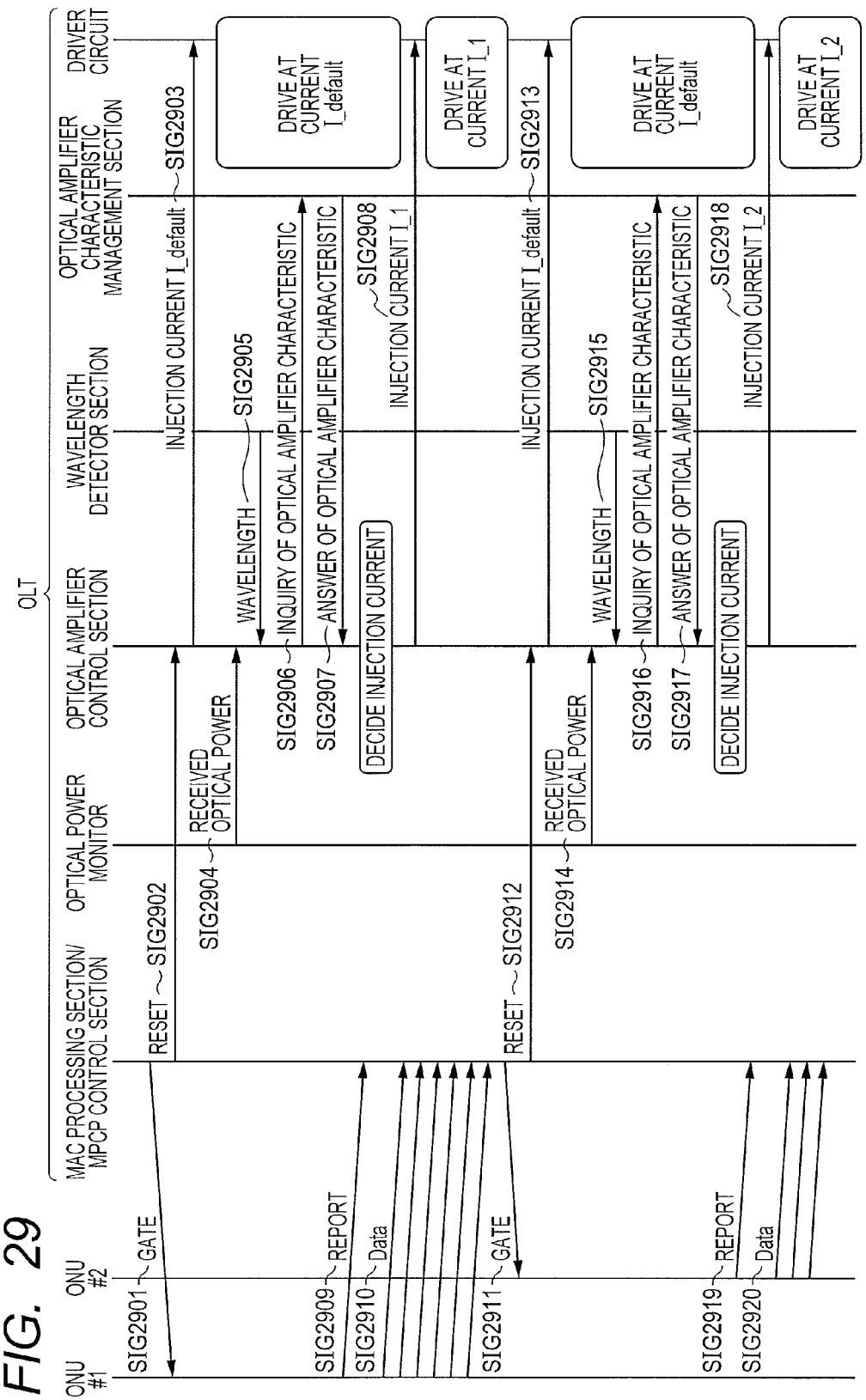
FIG. 29 is an example of a sequence at the time of the normal transmission in the eighth embodiment of the present invention.

FIG. 29 shows an operation sequence at the time of the normal transmission in the eighth embodiment of the present invention. In this sequence, only components necessary to explain operations in the normal transmission among the components of the OLT are depicted. Moreover, in order to simplify the explanation, the explanation will be given assuming that only two ONU's, ONU1 and ONU2, are connected.

The operation sequence is almost the same as the operation sequence of the third embodiment. A difference is a point that when the optical amplifier acquires the wavelength from the wavelength detection section, an exchange (SIG2904) of acquiring the received optical power information from the optical power monitor is added. Since other operations are the same, their detailed explanations are omitted. By the above sequence, it is possible to adjust the injection current according to the transmission wavelength and the received optical power of the ONU.

[Example of Operation Sequence at the Time of Discovery in the Eighth Embodiment]

Moreover, since the operations at the time of Discovery are not different from the operations at the time of the normal transmission, their explanations are omitted.

Effect in the Eighth Embodiment

In the eighth embodiment, by adjusting the amount of injection current for every wavelength and every received optical power of the received burst signal, it is possible to extend the receivable range of optical power further compared with the first to seventh embodiments.

Ninth Embodiment

A ninth embodiment of the present invention will be described. While in the eighth embodiment, the injection current of the optical amplifier was controlled based on the optical amplifier input power; in the ninth embodiment, the injection current of the optical amplifier is controlled based on the optical amplifier output power. Here, the explanation will be given focusing on a difference with respect to the eighth embodiments.

[Configuration of Optical Receiver Section in the Ninth Embodiment]

Figure 30:
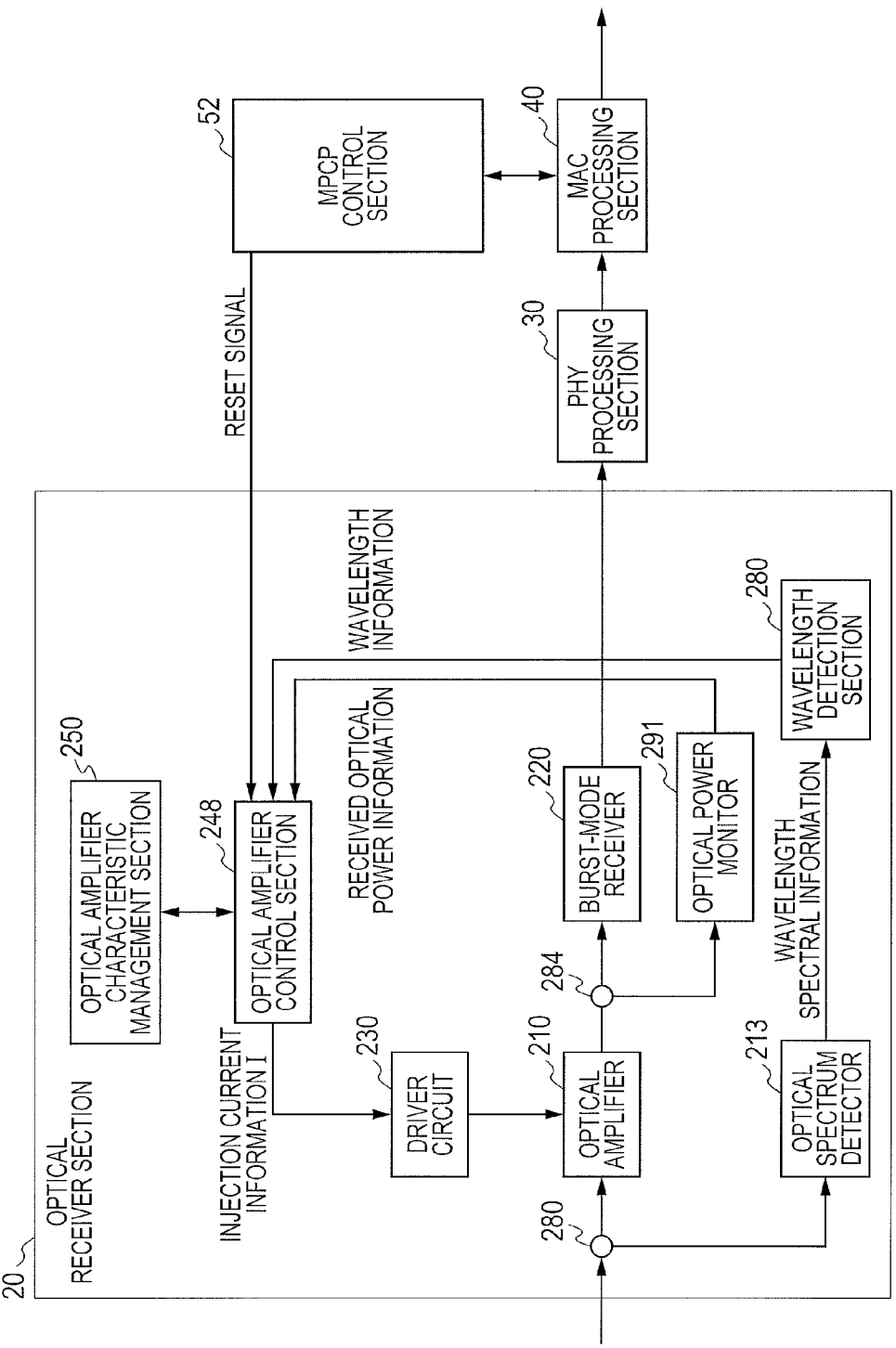
FIG. 30 is a configuration of an optical receiver section in a ninth embodiment of the present invention

FIG. 30 shows a configuration of an optical receiver section 20 in the ninth embodiment of the present invention. In the ninth embodiment, the optical splitter placed in the eighth embodiment is placed on the output side of the optical amplifier.

The optical splitter 284 distributes the inputted optical signal to the optical amplifier 210 and the optical power monitor 286. A ratio of distribution does not need to be 50% each. For example, the ratio may be 90% to the optical amplifier 210 and 10% to the optical spectrum detector 281.

The optical power monitor 291 detects the optical power of the inputted optical signal, and outputs a voltage signal proportional to the optical power to the optical amplifier control section 247. The optical power monitor is comprised of a photodiode and a transimpedance amplifier, for example. Since the distribution ratios in the optical splitters 280, 284 are constant, the output of this optical power monitor 286 will be almost proportional to the optical power outputted from the optical amplifier 210. Incidentally, since an optical power monitor 291 is monitoring an output of the optical amplifier, the output also includes ASE (Amplified Spontaneous Emission) light occurring in the optical amplifier. Therefore, especially in the case where the input power is small, the optical power monitor needs an adjustment so as to output the received optical power from which a portion of the ASE is subtracted in order not to output a larger strength than the strength of the optical signal because of being affected by the ASE light.

Based on the received optical power information acquired from the optical power monitor 291, the wavelength information acquired from the wavelength detection section 280, and the optical amplifier characteristic information acquired from the optical amplifier characteristic management section 250, the optical amplifier control section 248 decides the injection current and outputs the injection current information I representing the amount of injection current to the driver circuit 230. Moreover, it sets the injection current information to the default current value I_default based on the reset signal acquired from the MPCP control section 52.

[Operations of Optical Amplifier Control Section in the Ninth Embodiment]

Since operations of the optical amplifier control section in a ninth embodiment are the same as those of the eighth embodiment, their detailed explanations are omitted.

[Example of Operation Sequences at the Time of Normal Transmission and at the Time of Discovery in the Ninth Embodiment]

Since operations at the time of the normal transmission and at the time of Discovery in a ninth embodiment are the same as those of the eighth embodiment, their detailed explanations are omitted.

Effect in the Ninth Embodiment

In the ninth embodiment, by adjusting the amount of injection current for every wavelength and for every received optical power of the received burst signal, it is possible to extend the receivable range of the optical power in the ninth embodiment further compared with the first to seventh embodiments. Moreover, since the output of the optical amplifier is monitored and controlled and thereby there is no optical splitter for optical power monitor on the optical amplifier input side, it is possible to prevent degradation of the receive sensitivity of the optical receiver section.

[Supplement]

In this explanation, although the optical amplifier was explained as a key device, the present invention can be similarly applied to a case where an optical fiber amplifier is used. Moreover, it is also applicable to a mode where any of the first to ninth embodiments are combined.

What is claimed is:

1. An optical receiver unit connected to a plurality of optical network units (ONUs) via optical fiber and an optical splitter, comprising:
    an optical amplifier that amplifies an input optical signal from one of the plurality of ONUs;
    a burst-mode optical receiver that converts an output of the optical amplifier into an electrical signal;
    a driver circuit that drives a drive injection current of the optical amplifier;
    a wavelength estimation unit that generates an estimated wavelength of the input optical signal; and
    an optical amplifier control unit that controls the drive injection current of the optical amplifier based on an acquired wavelength of the input optical signal and the estimated wavelength of the input optical signal.

2. The optical receiver unit according to claim 1, further comprising:
    an optical amplifier characteristic management unit that retains first correspondence information including stored optical amplifier gains, stored injection currents, first stored wavelengths, and polarization directions of the input optical signal,
    wherein the optical amplifier control unit controls the drive injection current based on the first correspondence information.

3. The optical receiver unit according to claim 2, further comprising:
    an ONU wavelength management unit that retains second correspondence information including second stored wavelengths of the input optical signal and ONU identifiers of the plurality of ONUs,
    wherein the optical amplifier control unit acquires one of the ONU identifiers, specifies the acquired wavelength of the input optical signal based on the acquired ONU identifiers and the second correspondence information, and controls the drive injection current based on the first correspondence information and the acquired wavelength of the input optical signal.

4. The optical receiver unit according to claim 1, further comprising:
a received optical strength detector unit that detects a strength of the input optical signal and outputs a strength of the input optical signal as a received signal strength indicator (RSSI),
wherein the optical amplifier control unit also controls the drive injection current based on the RSSI.

5. The optical receiver unit according to claim 1, further comprising:
an ONU wavelength management unit that retains second correspondence information including a stored wavelength of the input optical signal and an ONU identifier of the one of the plurality of ONUs, and
a wavelength registration unit that registers the estimated wavelength as the stored wavelength of the input signal at a registration time of the one of the plurality of ONUs.

6. The optical receiver unit according to claim 1, further comprising:
a gain estimation unit that estimates a gain of the optical amplifier,
wherein the wavelength estimation unit generates the estimated wavelength of the input optical signal based on the gain of the optical amplifier and information from an optical amplifier characteristic management unit.

7. The optical receiver unit according to claim 6, further comprising:
a first multi point control protocol (MPCP) control unit that calculates a round trip time (RTT) between the one of the plurality of ONUs and an OLT,
wherein the gain estimation unit estimates the gain of the optical amplifier based on the RTT and a received signal strength indicator (RSSI) of the input optical signal.

8. The optical receiver unit according to claim 6, further comprising:
a first optical splitter that splits the input optical signal to the optical amplifier unit and a first optical power monitor; and
a second optical splitter that splits the output optical signal from the optical amplifier unit to a second optical power monitor;
wherein the gain estimation unit estimates the gain of the optical amplifier based on a power of the input optical signal detected by the first optical power monitor and a power of the output optical signal detected by the second optical power monitor.

9. The optical receiver unit according to claim 1, further comprising:
a second multi point control protocol (MPCP) control unit that specifies an uplink transmission rate of the input optical signal at a registration time of the one of the plurality of ONUs,
wherein the wavelength estimation unit generates the estimated wavelength based on the specified uplink transmission rate.

10. The optical receiver unit according to claim 1, further comprising:
a rate determination unit that determines a receive rate of the input optical signal based on the electrical signal from the burst-mode receiver,
wherein the wavelength estimation unit generates the estimated wavelength of the input optical signal based on the determined receive rate.

11. The optical receiver section according to claim 2, further comprising:
a variable attenuator that attenuates an output signal of the optical amplifier based on an attenuation signal from the optical amplifier control unit,
wherein the optical amplifier control unit generates the attenuation signal based on the first correspondence information and the acquired wavelength of the input optical signal.

12. The optical receiver section according to claim 2,
wherein the optical amplifier control unit acquires the stored optical amplifier gains for each polarization direction of the input optical signal at each stored injection current for the acquired wavelength from the optical amplifier characteristic management unit,
calculates an average optical amplifier gain of stored optical amplifier gains in respective polarization directions at respective stored injection currents, and
determines the drive injection current based on the average optical amplifier gain and a target optical amplifier gain.

13. The optical receiver section according to claim 2,
wherein the optical amplifier control unit acquires the stored optical amplifier gains for each polarization direction of the input optical signal at each stored injection current for the acquired wavelength,
calculates a larger one of two stored optical amplifier gains for each polarization direction at each stored injection current, and
determines the drive injection current based on a calculated optical amplifier gain and a target optical amplifier gain.

14. The optical receiver section according to claim 2,
wherein the optical amplifier control unit acquires the stored optical amplifier gains for each polarization direction of the input optical signal at each stored injection current for the acquired wavelength of input optical signal from the optical amplifier characteristic management unit,
calculates a smaller one of two stored optical amplifier gains for each polarization direction of the input optical signal at each stored injection current, and
determines the drive injection current based on a calculated optical amplifier gain and a target optical amplifier gain.

15. The optical receiver section according to claim 2 further comprising:
a received optical strength detector unit that detects a strength of the input optical signal and outputs a detected strength of the input optical signal as a received signal strength indicator (RSSI),
wherein the optical amplifier control unit acquires stored optical amplifier gains for each polarization direction of the input optical signal at each stored injection current for the acquired wavelength of the input optical signal, acquires the RSSI,
if an acquired RSSI is smaller than a threshold, calculates the drive injection current based on a smaller one of the stored optical amplifier gains for each polarization direction of the input optical signal and a target optical amplifier gain, and
if the acquired RSSI is larger than the threshold, calculates the drive injection current based on a larger one of the stored optical amplifier gains for each polarization direction of the input optical signal and the target optical amplifier gain.

16. An optical line terminal (OLT) connected to a plurality of optical network units (ONUs) via optical fiber and an optical splitter, comprising:

an optical amplifier that amplifies an input optical signal from one of the plurality of ONUs;

a burst-mode optical receiver that converts an output of the optical amplifier into an electrical signal;

a driver circuit that drives a drive injection current of the optical amplifier; and a wavelength estimation unit that generates an estimated wavelength of the input optical signal;

an optical amplifier control unit that controls the drive injection current of the optical amplifier based on an acquired wavelength of the input optical signal and the estimated wavelength of the input optical signal.

17. The OLT according to claim 16, further comprising:

an optical amplifier characteristic management unit that retains first correspondence information including stored optical amplifier gains, stored injection currents, stored wavelengths of the input optical signal, and polarization directions of the input optical signal wherein the optical amplifier control unit controls the drive injection current based on the first correspondence information.

18. The OLT according to claim 17, further comprising:

an multi point control protocol (MPCP) control unit that outputs a reset signal to the optical amplifier control unit;

wherein the optical amplifier control unit controls the drive injection current based on the acquired wavelength of the input optical signal and the first correspondence information, and upon input of a reset signal, changes the drive injunction current to a default drive injunction current, and wherein the MPCP control unit outputs the reset signal to the optical amplifier control unit based on a reception timing of the input optical signal from the one of the plurality of ONUs.

19. An optical access system comprising:

an optical line terminal (OLT); and, a plurality of optical network units (ONUs) connected via optical fibers, and an optical splitter;

wherein the OLT includes:

an optical amplifier that amplifies an input optical signal from the one of the plurality of ONUs;

a burst-mode optical receiver that converts an output of the optical amplifier into an electrical signal;

a driver circuit that drives a drive injection current of the optical amplifier;

a wavelength estimation unit that generates an estimated wavelength of the input optical signal; and an optical amplifier control unit that controls the drive injection current of the optical amplifier based on a wavelength of the input optical signal and the estimated wavelength of the input optical signal, and wherein the optical amplifier control unit controls the drive injection current with a plurality of values when the OLT sends a signal for a registration to the one of the plurality of ONUs.

* * * * *